United States Patent
Shah et al.

(10) Patent No.: US 12,153,398 B2
(45) Date of Patent: Nov. 26, 2024

(54) SYSTEMS AND METHODS FOR DESIGNING AND MANUFACTURING AN ORTHODONTIC APPLIANCE

(71) Applicant: Ormco Corporation, Orange, CA (US)

(72) Inventors: Mithil J. Shah, North Hills, CA (US); Yevgeniy Sirovskiy, Castro Valley, CA (US)

(73) Assignee: Ormco Corporation, Orange, CA (US)

( * ) Notice: Subject to any disclaimer, the term of this patent is extended or adjusted under 35 U.S.C. 154(b) by 736 days.

(21) Appl. No.: 17/201,321

(22) Filed: Mar. 15, 2021

(65) Prior Publication Data
US 2021/0200188 A1    Jul. 1, 2021

Related U.S. Application Data

(63) Continuation-in-part of application No. 17/126,632, filed on Dec. 18, 2020, which is a continuation of
(Continued)

(51) Int. Cl.
*G05B 19/4099*    (2006.01)
*G06T 19/20*    (2011.01)

(52) U.S. Cl.
CPC .......... *G05B 19/4099* (2013.01); *G06T 19/20* (2013.01); *G05B 2219/35134* (2013.01);
(Continued)

(58) Field of Classification Search
CPC ...... G05B 19/4099; G05B 2219/35134; G05B 2219/49004; G06T 19/20; G06T 2210/41;
(Continued)

(56) References Cited

U.S. PATENT DOCUMENTS 7,711,447 B2    5/2010  Lu et al.
8,155,780 B2    4/2012  Lu et al.
(Continued)

FOREIGN PATENT DOCUMENTS

EP    3870097 B1    3/2024
WO    9806347 A1    2/1998

OTHER PUBLICATIONS

International Searching Authority, International Search Report and Written Opinion in corresponding International Application No. PCT/US2019/057414 dated Jan. 3, 2020.
(Continued)

*Primary Examiner* — Thomas C Lee
*Assistant Examiner* — Michael Tang
(74) *Attorney, Agent, or Firm* — Wood Herron & Evans LLP

(57) ABSTRACT

Systems and methods of defining a trimline in relation to modeled teeth including a three-dimensional model of one or more intraoral surfaces of the patient. The trimline is for use to manufacture an aligner. For one or more pairs of adjacent teeth, a scallop plane is defined based on a scallop factor. The scallop plane is used to determine the position of scallop points on a line around each tooth adjacent to an interproximal region of the pair of teeth. Transition points are then defined on the line around each tooth apically of the scallop points, and the points connected to form an initial connector curve. The initial connector curve is projected on to a mesh of the three-dimensional model, and smoothing applied to the resulting segmented connector curve. The smoothed connector curves are then joined by teeth curves to form the trimline.

23 Claims, 29 Drawing Sheets

Related U.S. Application Data application No. 16/168,075, filed on Oct. 23, 2018, now Pat. No. 10,935,958.

(52) U.S. Cl.
CPC  *G05B 2219/49004* (2013.01); *G06T 2210/41* (2013.01); *G06T 2219/2004* (2013.01)

(58) Field of Classification Search
CPC ....... G06T 2219/2004; G06T 2219/008; G06T 2219/2021; G06T 17/30
USPC .............................. 700/98; 264/16; 433/6, 24
See application file for complete search history.

(56) References Cited

U.S. PATENT DOCUMENTS

| | | | |
|---|---|---|---|
| 8,764,445 | B1 | 7/2014 | DeLuca |
| 2002/0055081 | A1 | 5/2002 | Hughes et al. |
| 2004/0197728 | A1 | 10/2004 | Abolfathi et al. |
| 2007/0072144 | A1 | 3/2007 | Imgrund et al. |
| 2008/0182220 | A1 | 7/2008 | Chishti et al. |
| 2008/0187887 | A1* | 8/2008 | Lu .......................... G16H 20/40 433/215 |
| 2009/0098502 | A1 | 4/2009 | Andreiko |
| 2010/0281370 | A1 | 11/2010 | Rohaly et al. |
| 2011/0045428 | A1 | 2/2011 | Boltunov et al. |
| 2011/0137626 | A1 | 6/2011 | Matov et al. |
| 2013/0089828 | A1 | 4/2013 | Borovinskih et al. |
| 2013/0177864 | A1 | 7/2013 | Hultgren et al. |
| 2013/0317800 | A1 | 11/2013 | Wu et al. |
| 2013/0325431 | A1 | 12/2013 | See et al. |
| 2014/0067335 | A1 | 3/2014 | Andreiko |
| 2014/0272772 | A1 | 9/2014 | Andreiko et al. |
| 2015/0282904 | A1 | 10/2015 | Fisker |
| 2017/0079748 | A1 | 3/2017 | Andreiko |
| 2018/0078336 | A1 | 3/2018 | Andreiko |
| 2018/0116762 | A1 | 5/2018 | Kopelman |
| 2018/0165818 | A1 | 6/2018 | Tsai et al. |
| 2019/0102880 | A1 | 4/2019 | Parpara et al. |
| 2019/0350680 | A1 | 11/2019 | Chekh et al. |
| 2020/0015936 | A1* | 1/2020 | Ye .............................. A61C 7/12 |
| 2020/0015943 | A1* | 1/2020 | Reynard ................... G06T 7/12 |
| 2020/0100871 | A1 | 4/2020 | Wang et al. |
| 2020/0125069 | A1 | 4/2020 | Sirovskiy et al. |
| 2021/0196430 | A1* | 7/2021 | Wilson ...................... G06T 7/12 |

OTHER PUBLICATIONS

Roger Wu, Automated Data Processing, https://www.youtube.com/watch?v=2phc584dHlg&feature=youtu.be, published on Jul. 15, 2020.

U.S. Patent and Trademark Office, Office Action issued in corresponding U.S. Appl. No. 16/168,075 mailed on Mar. 26, 2020.

U.S. Patent and Trademark Office, Notice of Allowance issued in corresponding U.S. Appl. No. 16/168,075 mailed on Oct. 28, 2020.

PCT Office, International Preliminary Report on Patentability issued in PCT/US2019/057414 mailed on Apr. 27, 2021.

PCT Office, International Preliminary Report on Patentability issued in PCT/US2022/019732 dated Sep. 12, 2023.

PCT Office, International Search Report and Written Opinion issued in PCT/US2022/019732 dated Jul. 18, 2022.

U.S. Patent and Trademark Office, Corrected Notice of Allowability issued in corresponding U.S. Appl. No. 16/168,075, mailed on Dec. 11, 2020 (5 pages).

U.S. Patent and Trademark Office, Office Action issued in corresponding U.S. Appl. No. 16/168,075 mailed on Jun. 29, 2020 (24 pages).

U.S. Patent and Trademark Office, Office Action issued in corresponding U.S. Appl. No. 17/126,632 mailed on May 9, 2024 (10 pages).

U.S. Patent and Trademark Office, Office Action issued in corresponding U.S. Appl. No. 17/126,632 mailed on Jan. 31, 2024 (26 pages).

European Patent Office, Examination Report issued in EP 19802389.7 dated May 25, 2023 (5 pages).

U.S. Patent and Trademark Office, Office Action issued in corresponding U.S. Appl. No. 17/126,632 mailed on Jun. 23, 2023 (50 pages).

* cited by examiner

SYSTEMS AND METHODS FOR DESIGNING AND MANUFACTURING AN ORTHODONTIC APPLIANCE

CROSS-REFERENCE TO RELATED APPLICATIONS

This application claims the benefit of U.S. application Ser. No. 17/126,632 filed on Dec. 18, 2020, and U.S. application Ser. No. 16/168,075 filed on Oct. 23, 2018, each entitled "Systems and Methods for Designing and Manufacturing an Orthodontic Appliance", the disclosures of which are incorporated by reference herein in their entireties.

TECHNICAL FIELD

The present invention relates generally to the field of orthodontic treatment and, more particularly, to systems and methods of manufacturing orthodontic appliances.

BACKGROUND

Orthodontics is the practice of manipulating teeth to correct malocclusions between the teeth of the upper and lower dental arches. Typically, treatment of malocclusions includes the use of an orthodontic appliance that applies corrective forces to the teeth. Over time, these corrective forces coerce the teeth to move into their orthodontically correct positions.

One way of applying corrective forces is with orthodontic brackets. Treatment using brackets includes attaching a bracket to each of the teeth being treated. These brackets are then coupled to an archwire. The archwire may be coupled to the brackets using ligatures. Ligatures are small elastomeric o-rings that retain the archwire within a slot of the bracket. The archwire is resilient and exerts corrective forces on the teeth via the brackets. During treatment with brackets, the patient must periodically visit the orthodontist to replace the archwire with a new archwire which is typically larger in cross-sectional dimension.

As an alternative to braces, which remain adhered to the patient's teeth during the entire treatment, orthodontists may utilize orthodontic appliances referred to as "dental aligners," or simply "aligners." Aligners are generally supplied as a series of removable appliances that incrementally reposition the patient's teeth from their initial orientation to their orthodontically correct orientation. Patients being treated with aligners can insert and remove the aligners at will, and therefore do not need to visit the orthodontist for adjustments. Rather, when the currently worn aligner has moved the teeth to at or near a final orientation for that aligner, the patient merely begins using the next aligner in the series according to a treatment plan.

To fabricate aligners, the orthodontist first obtains a computer model of the patient's dentition. This model may be generated, for example, by taking an impression of the dentition and scanning the impression into a computer. Alternatively, the clinician may directly scan the patient's teeth with an intraoral scanner. The scanned data is then used to construct the computer model. Once the computer model has been obtained, the orthodontist may determine a target orientation of the teeth that provides a corrected dentition. Multiple computer models may then be generated, with each model corresponding to an incremental orientation of the dentition from an initial orientation to a target orientation. The incremental orientations from initial to target orientations may move the patient's teeth according to a proposed treatment plan. Treatment plans typically include numerous stages of movement from an initial orientation to a target orientation of the teeth. Depending on the degree of tooth movement, treatment plans may include a number of aligners that are worn in a predetermined sequence from an initial orientation to a final orientation.

Fabrication of the aligners typically involves forming plastic sheets onto a mold constructed of target orientations of the dentition according to the computer models. After each aligner is formed, excess material must be trimmed from it. However, due to the complex shapes and relatively small sizes of human dentition, this trimming task is difficult. Methods of trimming away a waste portion of the sheet from the aligner include manual trimming with scissors, which is time consuming and requires significant skill. Trimming using a Computer Numeric Control (CNC) milling machine has also been attempted. However, using a CNC milling machine involves a complicated setup procedure that is both expensive and that must be implemented for each aligner being trimmed. A trimline implemented may change for each aligner or for groups of aligners for each patient. Moreover, when CNC milling is used, a certain percentage of the aligners cannot be completely separated by CNC milling alone due to spatial limitations in the milling process. And, there are other problems, as machined aligners often require subsequent processing to improve the edge quality, for example, to remove burrs and round sharp edges produced during CNC milling.

Not only are there problems with CNC milling, clinicians may have particular preferences for their patients and so may manually modify aligners in accordance with those preferences. While these modifications are made with good intentions, the resultant aligner often has less than optimum performance. Ultimately, manual field modifications often prolong treatment and so are made at the expense of the patient.

These difficulties are exacerbated by recent advancements in aligner technology. Devices, such as attachments and buttons over which an aligner fits, often reduce the spatial accessibility of milling tools to accurately CNC mill the aligner edge in the region of the attachment or button. The difficulties in trimming caused by attachments and devices restrict placement of these devices. With these machining limitations in mind, the design of the aligner may be compromised to maintain manufacturability. Further, clinicians sometimes modify aligners to facilitate the use of the aligner with a secondary appliance in conjunction with the aligner.

While generally successful, there remain problems in the manufacturing of aligners. Thus, improved methods, systems, and computer program products are needed in the fabrication of aligners.

SUMMARY

The present invention overcomes the shortcomings and drawbacks of methods and systems for modeling and manufacturing of aligners heretofore known for use in orthodontic treatment. While the invention will be described in connection with certain embodiments, it will be understood that the invention is not limited to those embodiments. On the contrary, the invention includes all alternatives, modifications and equivalents as may be included within the spirit and scope of the present invention.

In an embodiment of the invention, a method of defining a trimline for use in the manufacture of an aligner for a patient is provided. The method includes receiving a point cloud representing a three-dimensional model of one or more intraoral surfaces of the patient in a virtual space. The one or more intraoral surfaces are associated with a plurality of teeth including a first tooth, a second tooth adjacent to the first tooth, and an interproximal region between the first and second teeth. The method further generates a first line around the first tooth and a second line around the second tooth, and defines a scallop plane for the first and second teeth. The method further defines a first scallop point adjacent to the interproximal region where the scallop plane intersects the first line around the first tooth, and a second scallop point adjacent to the interproximal region where the scallop plane intersects the second line around the second tooth. A first transition point is defined a first predetermined distance from the first scallop point along the first line around the first tooth toward a gingival zenith of the first tooth from the first scallop point, and a second transition point is defined a second predetermined distance from the second scallop point along the second line around the second tooth toward the gingival zenith of the second tooth from the second scallop point. The method then defines an initial connector curve including an interproximal segment connecting the first scallop point to the second scallop point, a first transition segment connecting the first transition point to the first scallop point, and a second transition segment connecting the second transition point to the second scallop point.

In an aspect of the invention, the interproximal segment may include a line that connects the first scallop point to the second scallop point, the first transition segment may include a first portion of the first line around the first tooth connecting the first transition point to the first scallop point, and the second transition segment may include a second portion of the second line around the second tooth connecting the second transition point to the second scallop point.

In another aspect of the invention, the method may further include generating a mesh from the point cloud, and projecting the initial connector curve onto the mesh to generate an initial polyline. The mesh may model the one or more intraoral surfaces, and include a plurality of mesh vertices and a plurality of edges, with each edge connecting a pair of the plurality of mesh vertices, and each closed set of edges defining a face of the mesh.

In another aspect of the invention, generating the initial polyline may include generating a polyline vertex at each point in the virtual space where a projection of either the first transition segment or the second transition segment crosses one of the edges, and connecting each polyline vertex to at least one other polyline vertex with a polyline segment that crosses the face defined by the closed set of edges including the edges on which the polyline segment terminates.

In another aspect of the invention, generating the initial polyline may include identifying one or more edges that connect a first projected scallop point to a second projected scallop point, and defining one or more polylines coextensive with the one or more edges connecting the first projected scallop point to the second projected scallop point.

In another aspect of the invention, the one or more edges may be identified as those edges providing a shortest path between the first projected scallop point and the second projected scallop point.

In another aspect of the invention, the first projected scallop point may be positioned at a point on the edge closest to a position of a projection of the first scallop point onto the mesh, and the second projected scallop point may be positioned at the point on the edge closest to the position of the projection of the second scallop point onto the mesh.

In another aspect of the invention, the method may include applying a smoothing function to the initial polyline to generate a smoothed polyline.

In another aspect of the invention, the method may include validating the smoothed polyline, and if the smoothed polyline fails validation, reapplying the smoothing function until the smoothed polyline passes validation, or a maximum number of iterations is reached.

In another aspect of the invention, defining the scallop plane may include determining a position of a first enamel-gingival junction point of the first tooth, determining the position of a second enamel-gingival junction point of the second tooth, determining a crown-long axis for one of the first tooth or the second tooth, defining a first scallop offset point on a first enamel surface of the first tooth that is offset occlusally from the first enamel-gingival junction point by a first scallop factor, defining a second scallop offset point on a second enamel surface of the second tooth that is offset occlusally from the second enamel-gingival junction point by a second scallop factor, and defining the scallop plane as a plane that includes the first scallop offset point, the second scallop offset point, and a surface normal parallel to the crown-long axis.

In another aspect of the invention, each scallop factor may be a percentage of a crown height of its respective tooth, a constant offset, or a sum of the percentage of the crown height and the constant offset.

In another aspect of the invention, the first and second enamel-gingival junction points may be either labial-enamel-gingival junction points or lingual-enamel-gingival junction points.

In another aspect of the invention, the three-dimensional model may be one of a plurality of three-dimensional models each associated with a stage of treatment, and the method may further include generating an initial three-dimensional model of the teeth and one or more gingiva of the patient from surface imagery, intraoral scan imagery, or both the surface and the intraoral scan imagery. The method may segment the initial three-dimensional model into a plurality of segmented modeled teeth and at least one segmented modeled gingiva. The method may then define each of the three-dimensional models by incrementally adjusting the position, orientation, or both the position and the orientation of one or more of the segmented modeled teeth to generate a set of adjusted segmented modeled teeth, generating at least one morphed segmented modeled gingiva by morphing the at least one segmented modeled gingiva to match the set of adjusted segmented modeled teeth, stitching the at least one morphed segmented modeled gingiva to the set of adjusted segmented modeled teeth, and filling gaps in one or more interproximal areas between adjacent adjusted modeled teeth to extend the modeled gingiva into previously empty regions between the adjacent adjusted modeled teeth.

In another embodiment of the invention, a system that defines a trimline for use in the manufacture of an aligner for a patient is provided. The system includes one or more processors, and a memory coupled to the one or more processors. The memory includes program code that, when executed by the one or more processors, causes the system to receive the point cloud representing the three-dimensional model of the one or more intraoral surfaces of the patient in the virtual space. The one or more intraoral surfaces are associated with the plurality of teeth including the first tooth, the second tooth adjacent to the first tooth, and the interproximal region between the first and second teeth. The program code further causes the system to generate the first line around the first tooth and the second line around the second tooth, define the scallop plane for the first and second teeth, and define first and second scallop points adjacent to the interproximal region where the scallop plane intersects the first and second lines around the first and second teeth. The program code further causes the system to define the first transition point the first predetermined distance from the first scallop point along the first line around the first tooth toward a gingival zenith of the first tooth from the first scallop point, and define the second transition point the second predetermined distance from the second scallop point along the second line around the second tooth toward the gingival zenith of the second tooth from the second scallop point. The program code further causes the system to define the initial connector curve including the interproximal segment connecting the first scallop point to the second scallop point, the first transition segment connecting the first transition point to the first scallop point, and the second transition segment connecting the second transition point to the second scallop point.

In another aspect of the invention, the program code may cause the system to generate the initial polyline by generating, from the point cloud, the mesh that models the one or more intraoral surfaces. The mesh may include the plurality of mesh vertices and the plurality of edges each connecting the pair of the plurality of mesh vertices, with each closed set of edges defining a face of the mesh. The program code may further cause the system to generate the initial polyline by projecting the initial connector curve onto the mesh, generating a polyline vertex at each point in the virtual space where the projection of either the first transition segment or the second transition segment crosses one of the edges, connecting each polyline vertex to at least one other polyline vertex with a polyline segment that crosses the face defined by the closed set of edges including the edges on which the polyline segment terminates, identifying the one or more edges that connect the first projected scallop point to the second projected scallop point, and defining the one or more polylines coextensive with the one or more edges connecting the first projected scallop point to the second projected scallop point.

In another aspect of the invention, the first projected scallop point may be positioned at the point on the edge closest to the position of the projection of the first scallop point onto the mesh, and the second projected scallop point may be positioned at the point on the edge closest to the position of the projection of the second scallop point onto the mesh.

In another aspect of the invention, the program code may cause the system to apply the smoothing function to the initial polyline to generate the smoothed polyline, validate the smoothed polyline, and if the smoothed polyline fails validation, reapply the smoothing function until the smoothed polyline passes validation, or the maximum number of iterations is reached.

In another aspect of the invention, the program code may cause the system to define the scallop plain by determining the position of the first enamel-gingival junction point of the first tooth, determining the position of the second enamel-gingival junction point of the second tooth, determining the crown-long axis for one of the first tooth or the second tooth, defining the first scallop offset point on the first enamel surface of the first tooth that is offset occlusally from the first enamel-gingival junction point by the first scallop factor, defining the second scallop offset point on the second enamel surface of the second tooth that is offset occlusally from the second enamel-gingival junction point by the second scallop factor, and defining the scallop plane as the plane that includes the first scallop offset point, the second scallop offset point, and the surface normal parallel to the crown-long axis.

In another aspect of the invention, each scallop factor is one of the percentage of the crown height of its respective tooth, the constant offset, or the sum of the percentage of the crown height and the constant offset, and the first and second enamel-gingival junction points are either labial-enamel-gingival junction points or lingual-enamel-gingival junction points.

In another aspect of the invention, the three-dimensional model may be one of the plurality of three-dimensional models each associated with a stage of treatment, and the program code may further cause the system to generate the initial three-dimensional model of the teeth and one or more gingiva of the patient from the surface imagery, the intraoral scan imagery, or both the surface imagery and the intraoral scan imagery, and segment the initial three-dimensional model into the plurality of segmented modeled teeth and the at least one segmented modeled gingiva. The program code may then cause the system to define each of the three-dimensional models by incrementally adjusting the position, the orientation, or both the position and the orientation of the one or more segmented modeled teeth to generate the set of adjusted segmented modeled teeth, generate the at least one morphed segmented modeled gingiva by morphing the at least one segmented modeled gingiva to match the set of adjusted segmented modeled teeth, stitch the at least one morphed segmented modeled gingiva to the set of adjusted segmented modeled teeth, and fill gaps in the one or more interproximal areas between the adjacent adjusted modeled teeth to extend the modeled gingiva into previously empty regions between the adjacent adjusted modeled teeth.

In another embodiment of the invention, a computer program product that defines the trimline for use in the manufacture of the aligner for the patient is provided. The computer program product includes a non-transitory computer-readable storage medium and program code stored on the non-transitory computer-readable storage medium. The program code is configured so that when it is executed by one or more processors, the program code causes the one or more processors to receive the point cloud representing the three-dimensional model of the one or more intraoral surfaces of the patient in the virtual space. The one or more intraoral surfaces are associated with a plurality of teeth including the first tooth, the second tooth adjacent to the first tooth, and the interproximal region between the first tooth and the second tooth. The program code is further configured to cause the one or more processors to generate the first line around the first tooth and the second line around the second tooth, and define the scallop plane for the first and second teeth. The program code is further configured to cause the one or more processors to define the first scallop point adjacent to the interproximal region where the scallop plane intersects the first line around the first tooth, and define the second scallop point adjacent to the interproximal region where the scallop plane intersects the second line around the second tooth. The program code is further configured cause the one or more processors to define the first transition point the first predetermined distance from the first scallop point along the first line around the first tooth toward the gingival zenith of the first tooth from the first scallop point, and define the second transition point the second predetermined distance from the second scallop point along the second line around the second tooth toward the gingival zenith of the second tooth from the second scallop point. The program code is further configured to cause the one or more processors to define the initial connector curve as including the interproximal segment connecting the first scallop point to the second scallop point, the first transition segment that connects the first transition point to the first scallop point, and the second transition segment that connects the second transition point to the second scallop point.

BRIEF DESCRIPTION OF THE DRAWINGS

The accompanying drawings, which are incorporated in and constitute a part of this specification, illustrate embodiments of the invention and together with the detailed description given below, serve to explain various aspects of the invention.

DETAILED DESCRIPTION

Figure 1:
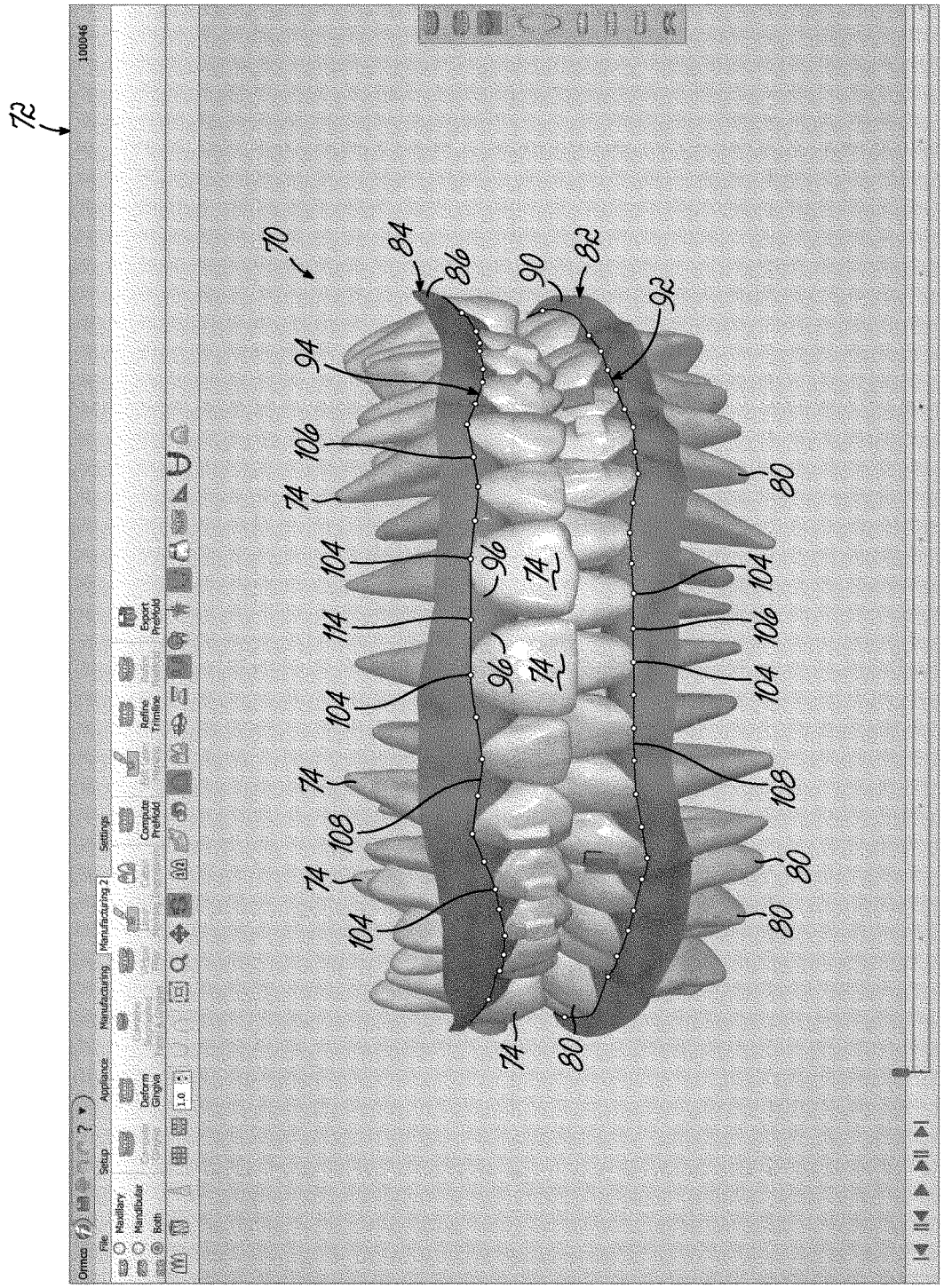
FIG. 1 is a 3-D tooth model displayed in a system according to one embodiment of the invention.

Embodiments of the invention are directed to computer-implemented methods, systems, and computer program products for fabricating dental aligners. In particular, embodiments of the invention are utilized to digitally produce a trimline. The digital trimline defines a tool path by which a waste portion of a workpiece is cut away from an aligner portion of the workpiece after forming. For example, a machine tool, which may be coupled to a CNC milling machine, may be used to cut the workpiece during a trimming process. The machine tool removes material during the cutting process to reproduce the digital trimline as an edge of an aligner. The edge of the aligner affects patient comfort and can influence aligner performance.

Advantageously, embodiments of the invention reduce or eliminate any necessity for manual modification of the edges of one or more aligners in a series of aligners after those aligners are produced. Embodiments of the invention provide a clinician, such as an orthodontist, a staff member under instruction by the orthodontist, or an orthodontic device manufacturer, with the capability for digitally producing a trimline and modifying all or portions of the digital trimline prior to producing an aligner. Creating the trimline digitally with reference to the patient's teeth permits manual modification of the trimline to address patient specific problems. Thus, a plurality of modifications can be made and then assessed prior to manufacturing the aligner. In embodiments of the invention, once an initial trimline is defined, the initial trimline can be edited based on clinical needs. The edited, initial trimline may be automatically morphed onto multiple aligners to account for the predicted movement of the patient's teeth during treatment according to a treatment plan. Each trimline, whether constructed from a morphing process or manually created may be subject to manual editing and automatic validation.

In exemplary embodiments, according to one aspect, there is a method of creating, editing, and producing a digital trimline. The clinician uses a computer system to create and edit the position of the digital trimline relative to a three-dimensional model of the patient's teeth. The digital trimline and the clinician's modifications are continuously evaluated against predetermined parameters, described below, including any spatial limitations inherent in automated machining, such as CNC machining, and the predicted structural integrity of an aligner produced according to the digital trimline. The predetermined parameters guide the clinician in the development of a valid trimline, one that is machinable and also provides the necessary structural integrity for producing tooth movement, among other factors.

When the digital trimline approaches and/or violates any single one of the predetermined parameters, the system warns the clinician as to the problem portion of the digital trimline. The system provides the warning in near real time as the edit is made and indicates the portion of the digital trimline that is in violation of one or more of the predetermined parameters. The clinician may then reconsider the edit and/or readjust the digital trimline to address the warning. The clinician's edits may occur on a continuous basis while subjectively assessing the effect of those modifications on the patient's comfort and the effectiveness of treatment with an aligner produced with the digital trimline. In this way, the clinician has the capability to both simultaneously address specific problems associated with a patient's teeth, address any attachments or devices that may be used during orthodontic treatment, and incorporate their personal preferences in real time while satisfying predetermined parameters to produce a usable trimline.

To these and other ends, and with reference to FIGS. 1-4A, embodiments of the present invention may include systems and methods that use computers to model a patient's teeth, to prepare orthodontic treatment plans, and to design aligners based on the treatment plans. These systems provide an interface through which a clinician or other orthodontic specialist can create, edit, and communicate treatment plans, as well as implement design preferences and output data. Embodiments of the present invention enhance systems and improve the functionality and utility of such systems and methods, as set forth herein.

Figure 1A:
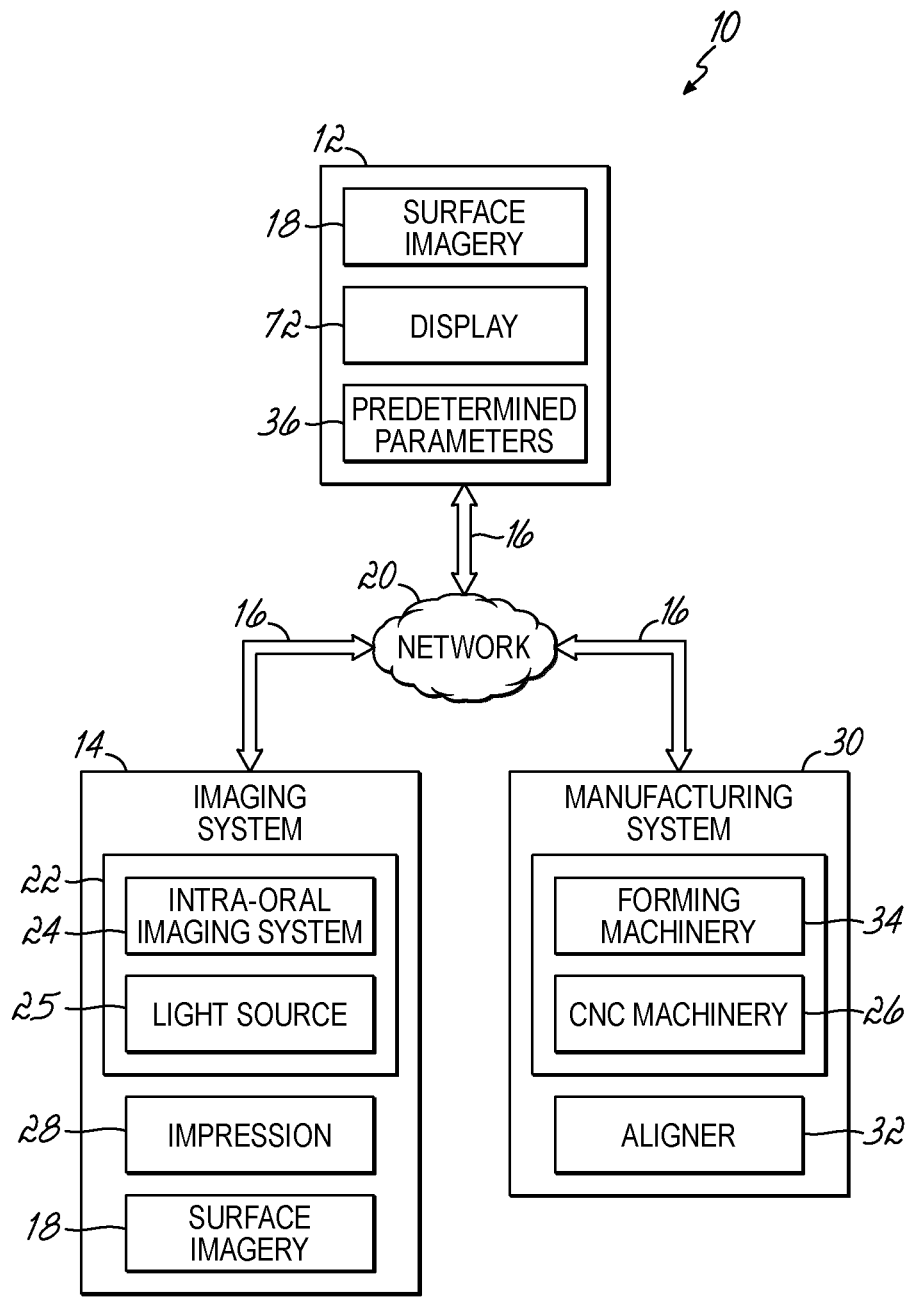
FIG. 1A is a schematic view of a system according to one embodiment of the invention.
Figure 2:
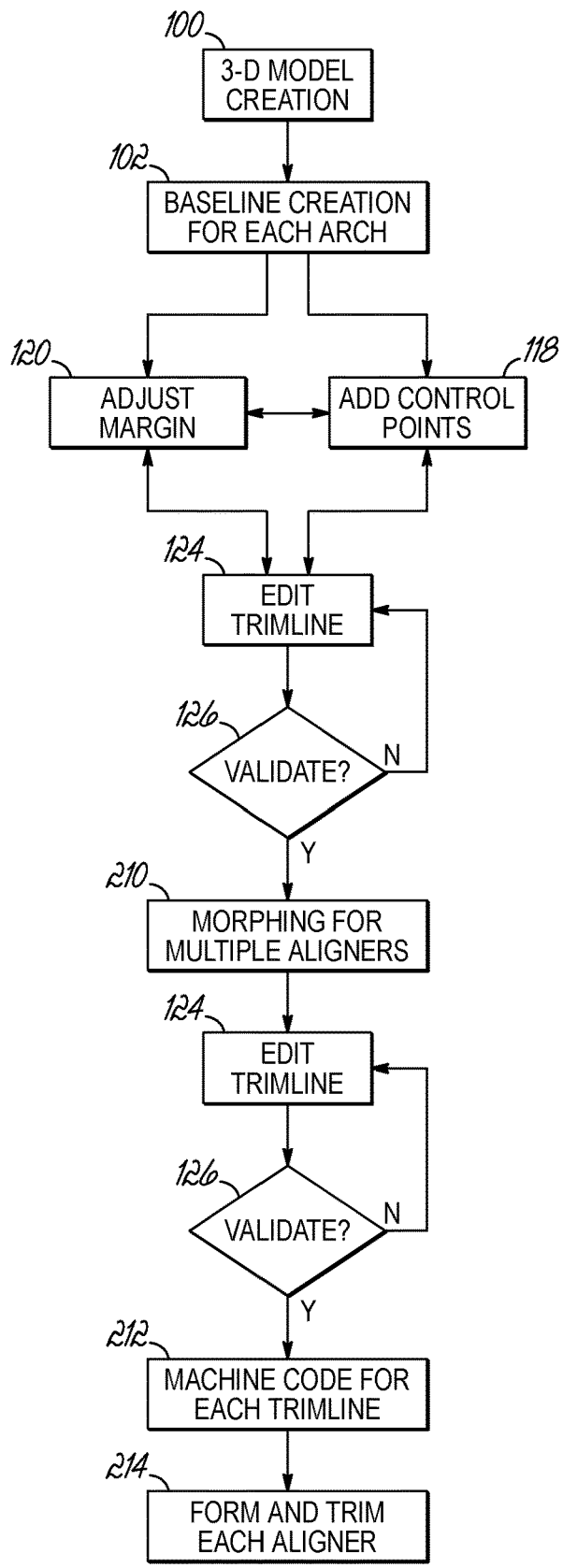
FIG. 2 is a flow chart of a process used in developing a trimline for an aligner.

With reference to FIGS. 1, 1A, and 2, in a computer implemented method, according to one embodiment, a clinician obtains or is provided with images of a patient's teeth, particularly the crowns of the patient's teeth, such as with an intraoral scanning device or PVS impression. The clinician may also obtain image information of the roots and crowns of the patient's teeth, such as volumetric data acquired from cone beam computed tomography (CBCT). The images may be in or importable into a 3-D virtual computer environment, or "virtual space". With one or both forms of data, a 3-D digital model 70 of the patient's teeth is produced at 100. By way of example only, systems and methods of preparing 3-D models of a patient's teeth are known according to at least U.S. Pub. No. 2018/0165818 and U.S. Pat. No. 10,368,719, which are assigned to Ormco Corporation and are incorporated by reference herein in their entireties.

In an exemplary embodiment and with reference to FIG. 1A, the system 10 includes a computer 12 and at least one imaging system 14. The computer 12 may receive multiple imageries from imaging system 14 and/or another imaging system. Imagery may include surface imagery 18 of one or more of the patient's teeth. The computer 12 may include any suitable computational device, such as a personal computer, a server computer, a mini computer, a mainframe computer, a blade computer, a tablet computer, a touchscreen computing device, a telephonic device, a cell phone, a mobile computational device, dental equipment having a processor, etc. In certain embodiments, the computer 12 may provide web services or cloud computing services. More than one computer may also be used for storing data and one or more predetermined parameters 36 or performing the operations performed by the computer 12 in accordance with the embodiments of the invention. In the embodiment shown, while not being limited to any particular network, the computer 12 is operatively coupled via one or more wired or wireless connections 16 to the imaging system 14 over a network 20. The network 20 may comprise a local area network, the Internet, an intranet, a storage area network, or any other suitable network.

With regard to an intra-oral imaging system, imaging system 14 may include a wand 22 having an imaging sensor 24 and a light source 25. The imaging sensor 24 may be an intra-oral camera that captures information regarding the oral cavity of the patient when exposed to light, for example from the light source 25. As is known, the practitioner may insert at least a portion of the wand 22 into the patient's mouth. Using the light source 25 and the imaging sensor 24, the practitioner may capture data of all or selected crowns of the patient's teeth. Alternatively, surface imagery 18 may be produced by scanning an impression 28 of the patient's teeth.

The system 10 may also include or be in electrical communication with a manufacturing system 30 capable of manufacturing the aligners 32. The manufacturing system 30 includes both forming machinery 34 and CNC machinery for machining 26 a trimline on each of the aligners 32.

With reference to FIG. 1, the 3-D digital model 70 of the patient's teeth is created from one or both types of surface imagery 18 in the computer 12. The 3-D digital model 70 is shown on an exemplary display 72 of the computer 12 and includes a plurality of crowns of the patient's teeth 74 as well as the corresponding roots on a maxillary jaw 84. And, the 3-D digital model 70 may also include a plurality of crowns of the patient's teeth 80 as well as the corresponding roots on a mandibular jaw 82. The teeth 74, 80 are shown projecting from a modeled gingiva 86, 90. The modeled gingiva 86, 90 may be computer generated (e.g., as a point cloud) and positioned on the teeth 74, 80 to conform with the image data available for producing the teeth 74, 80. Specifically, a point cloud is received from the image data of the patient's teeth, which are used to define triangular shapes across the gingival surface. As a result, the gingiva 86, 90 may be generated at locations consistent with the intraoral scan imagery. The segmented gingival surface may comprise the scan model of the upper and lower arches excluding the segmented surfaces of the teeth crowns. A 3-D digital model 70 including gingiva may be prepared for each stage in the orthodontic treatment plan by defining a control point for each triangular area on the gingival surface, and transferring this control point in space—along with the associated triangle—on movement paths that match the movement of the nearest tooth to the gingival area where the control point is defined. To this end, the modeled gingiva 86, 90 of each stage in the orthodontic treatment plan may be deformed based on the movement of the teeth 74, 80 relative to the previous stage.

In general, with the 3-D digital model 70 shown, the system 10 may create an initial digital trimline 92, 94 that may be edited prior to manufacturing of aligners for use on the mandibular jaw 82 and/or the maxillary jaw 84, respectively, at each stage of orthodontic treatment. Once in its final, edited configuration, the digital information on the trimline is then converted to machine code, such as to a tool path (described below with reference to FIGS. 14-18). The tool path may be used to produce an aligner (FIG. 18) with an edge to correlate with the digital trimline created with the 3-D digital model 70.

To that end, with reference to FIG. 1, the 3-D digital model 70 may represent an initial stage of treatment (i.e., stage zero), which often presents the most difficulties with valid trimline development. Referring to FIGS. 1 and 2, following creation of the 3-D digital model 70 at 100, the system 10 positions a plurality of margin points 104 proximate a gingival margin 96 for each of the teeth 74, 80 on a respective jaw 82, 84. The gingival margin 96 may have a curved shape defined by the boundary line between the gingiva 86, 90 and the surfaces of teeth 74, 80. The gingival boundary line may comprise a plurality of gingival boundary points at the intersection of the gingival and tooth surfaces. As shown, the margin points 104 may be proximate a gingival zenith of each tooth. By proximate, the location of the margin point 104 may be at a gingival-occlusal height of the gingival margin 96 though it may be spaced labially or lingually apart from the gingival margin 96 by a predetermined distance. The system 10 may default to the gingival-most locations proximate a modeled gingival margin 96 for creation of the margin points 104. As is described below, the clinician may selectively or globally adjust the location of each margin point 104, and further may define additional margin points along the margin of the tooth to better control and define the cut line for that tooth.

Once the margin points 104 are established and with continued reference to FIGS. 1 and 2, the system 10 creates the initial digital trimline 92, 94 (i.e., a baseline) connecting the margin points 104 at 102. In the exemplary embodiment shown, each baseline is a straightest possible line connecting the margin points 104 around each of the entire arches 82 and 84. When all parameters have a value of zero, this may generate the straightest possible baseline. The system 10 may create a baseline for each stage of treatment where the system 10 computes the gingiva. The baseline may include two types of curves—tooth curves 98 associated with each tooth 74, 80 and connector curves 100 connecting the tooth curves 98. By way of example, each margin point 104 shown defines a location on a tooth curve 98 (labeled in FIGS. 3 and 4). Each tooth curve 98 includes transition points 128 and both lingual and labial portions of each tooth curve 98 are based on the line around the tooth (LAT) 132. That is, the shape and location of each of the labial and lingual tooth curves 98 for a specific tooth may be defined at least in part by the LAT 132. The LAT 132 is defined where the modeled tooth 74, 80 cooperates with the modeled gingiva 86, 90. The clinician may adjust the tooth curves 98 with margin points 104 or by adjustment of the margin points 104 gingivally or occlusally by a margin parameter. The connector curves 100 connect the adjacent tooth curves 98 in the interproximal region. The clinician may edit the shape of each of the tooth curves 98 and the connector curves 100 to control the shape of the trimline.

As noted above, in one embodiment, in FIG. 2 at 118, to aid in editing the trimline in the interproximal regions, the clinician may optionally add one or more control points 106 between each margin point 104. The control points 106 define a location on a connector curve 100 and allow the clinician to control the shape of the connector curve 100 between transition points 128 with the adjacent tooth curves 98 where necessary. The relative position of the margin points 104 and the control points 106 may facilitate any desired scalloping of the trimline. In that regard, control points 106 are optional so that either or both of the trimlines 92, 94 may not include a single control point 106. Control points 106 may be removed at locations where a curved trimline in an interproximal region is not desired. In that case, the trimline may result in a relatively straight cut edge (i.e., no scallop) on an aligner that may be positioned at, occlusally of, or gingivally of the gingival margin 96 depending on the margin parameter.

When inserted, each control point 106 divides the baseline into a plurality of splines 108 connecting the control points 106 to adjacent margin points 104. The splines 108 essentially permit the clinician to control the transition of the tooth curves to the connector curves and vice versa. Thus, the shape of the splines 108 may be edited to track the gingival margin 96 along the teeth 74, 80 and to provide a curved transition in the interproximal regions between teeth 74, 80, as is described below. The clinician may optionally delete control points 106 if their presence causes a distortion in the trimlines 92, 94.

Figure 3:
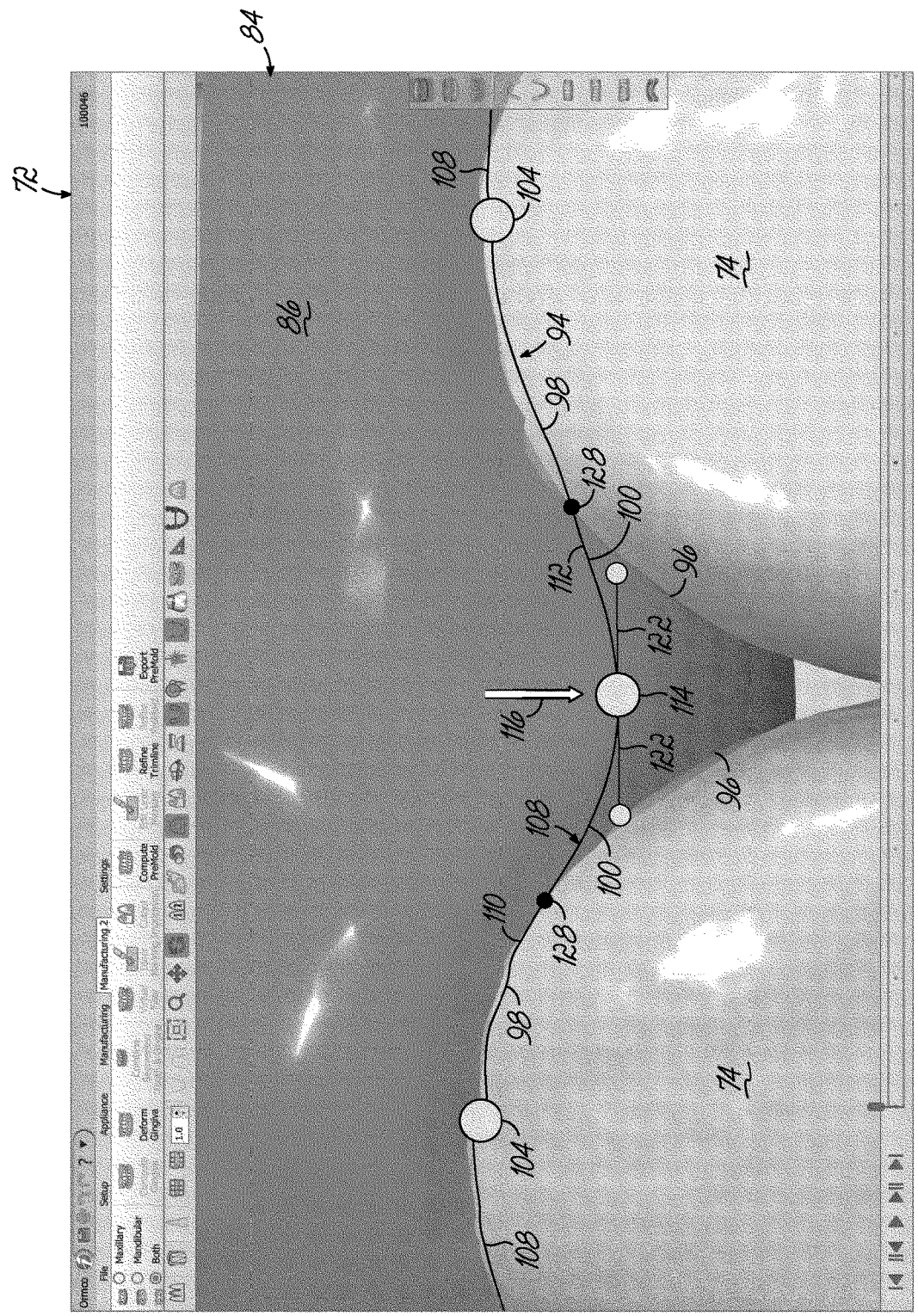
FIGS. 3, 4, 4A, 5, 6, 7, 8, 9, 10, 11, 12, and 13 depict alternative views of the 3-D tooth model of FIG. 1.

In the exemplary embodiment of FIG. 1, the splines 108 appear to collectively define digital trimlines 92 and 94 to be somewhat linear, however embodiments of the invention are not limited to any implied linearity. The splines 108 are defined by a polynomial in the three-dimensional space laying on the gingiva 90. Accordingly, they may be made to be complex curves through an editing process described below. For example, as is shown in FIG. 3, control point 114 divides the spline 108 between adjacent margin points 104 into two separately modifiable splines 110 and 112. While embodiments of the invention are described in which the control points 114 may appear to be midway between margin points 104, embodiments of the present invention are not limited to that location. The control point 114 permits collective and/or individual modification of splines 110 and 112.

According to one embodiment at 124 in FIG. 2, the clinician may edit the digital trimline 92, 94 from its baseline configuration by editing the tooth curves, connector curves, and the transitions points. For example, to edit the trimline 94 in FIG. 3, the clinician may move any single one of the margin points 104 or control points 106 and/or modify the splines 110 and 112. Editing the trimline 94 may include selectively moving one or more of the control points 106 relative to the margin points 104 as is generally indicated by comparison of the location of the control point 114 between FIGS. 1 and 3. For example, the clinician may select and then move control point 114 according to arrow 116 in FIG. 3 in an occlusal direction. Although not shown, the clinician may select and move the control point 114 in a gingival direction (i.e., opposite that shown according to arrow 116).

In the exemplary embodiment shown, movement according to arrow 116 may optionally initiate display of guides 122. In this way, the system 10 may provide a visual guide or ruler by which the clinician may visually assess the location of the control point 114 relative to the surrounding gingival margin 96 in the interproximal region. Advantageously, the system 10 provides guides for the clinician to use during editing to ensure that the trimline 94 is valid at all points between the adjacent margin points 104.

In the exemplary embodiment shown, the guides 122 are tangent to one or both of the splines 110, 112 at the control point 114. Further, as the control point 114 is moved according to arrow 116, the system 10 recalculates each of the splines 110 and 112 according to a parametric curve, such as a Bézier curve. This may produce a smooth, continuous transition from the spline 110 to the spline 112 or vice versa and so produces smooth transitions from the tooth curves to the connector curves. As is shown in FIG. 3, the splines 110 and 112 may trace the gingival margin 96 along portions of the teeth 74 that are defined by the tooth curves, but deviate from the modeled gingival margin 96 in the interproximal region between the adjacent teeth 74 along the connector curves. Following editing, the trimline 94 may have a scalloped appearance with a series of alternating convex and concave curves defined by the splines 108, 110, and 112.

With reference to FIG. 2, at 120 and 124, prior to or after addition of the control points 106 to the digital trimline 92, the clinician may globally adjust margin points 104. By way of example only, with reference now to FIG. 5, this modification may be in an occlusal direction, that is, all of the margin points 104 that define the digital trimline 92 may be moved occlusally by the same amount. This may be referred to as a margin parameter and indicated by the distance D. This is shown generally by arrows 150 in FIG. 5. The digital trimline 92 may be moved occlusally by D relative to the location of the initial digital trimline 92 (i.e., the baseline) shown in FIG. 1, which is shown at a gingival-most margin location. Although not shown, the digital trimline 92 may be moved in the opposite direction shown in FIG. 5. Thus, the trimline 92 may be moved gingivally by a distance, similar to distance D. If so, the trimline 92 may lie on or adjacent the gingival margin 96 at many, if not all, locations. Further, the trimlines 92 and 94 may be adjusted before or after addition of the control points 106.

Figure 4:
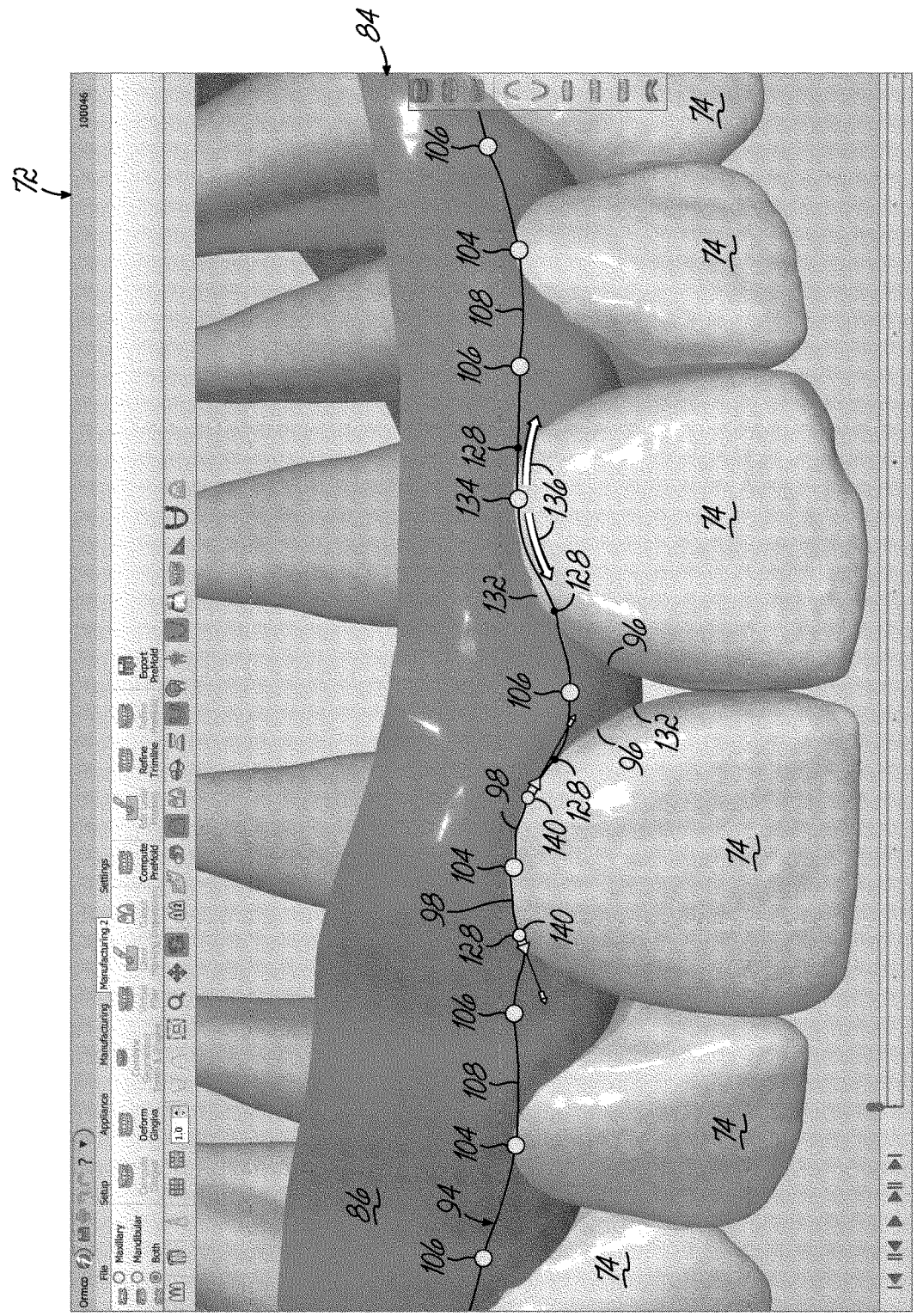
Figure 4A:
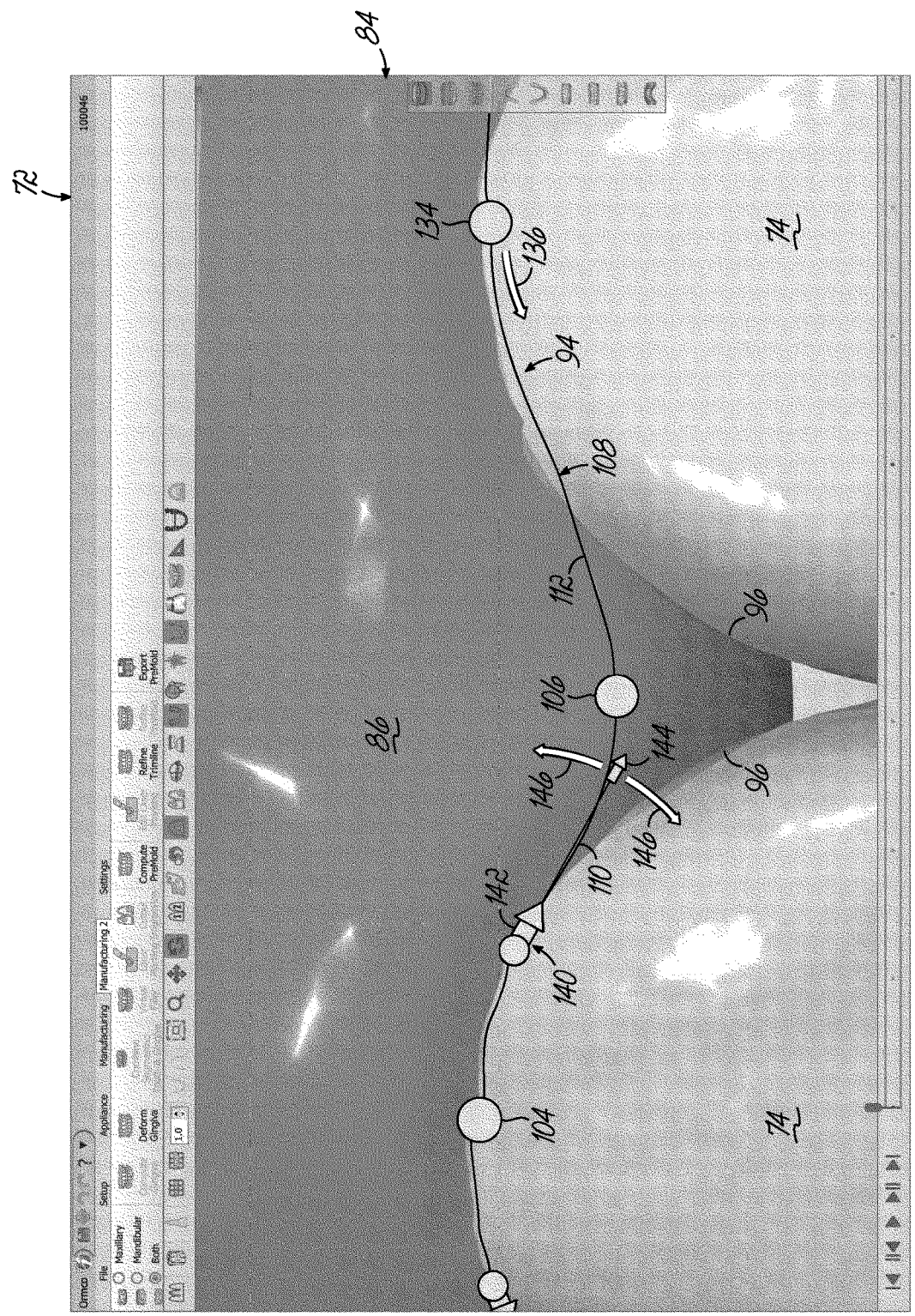

Further, the clinician may opt to move individual ones of the margin points 104, as is shown in FIGS. 4 and 4A, in addition to or in place of moving all margin points by a set distance. For example, in FIGS. 4 and 4A, during editing, the margin point 134 may be moved according to arrows 136 in relation to the gingival margin 96. In addition, the curvature of the trimline 94 between any margin point 104 and control point 106 may be adjusted by repositioning one or more vectors 140. As shown, the vectors 140 may be displayed as a base point 142 and directional indicator 144. The base point 142 may coincide with the transition points 128. In this way, the clinician may utilize the vectors 140 to modify the location and magnitude of a change in curvature of the individual splines 110, 112 without further moving the margin point 104 or control point 106. For example, the curvature of the spline 110 may be modified at a location of the base point 142 by changing the magnitude of the directional indicator 144 and its orientation by rotation about the base point 142 according to arrows 146 in FIG. 4A.

Figure 6:
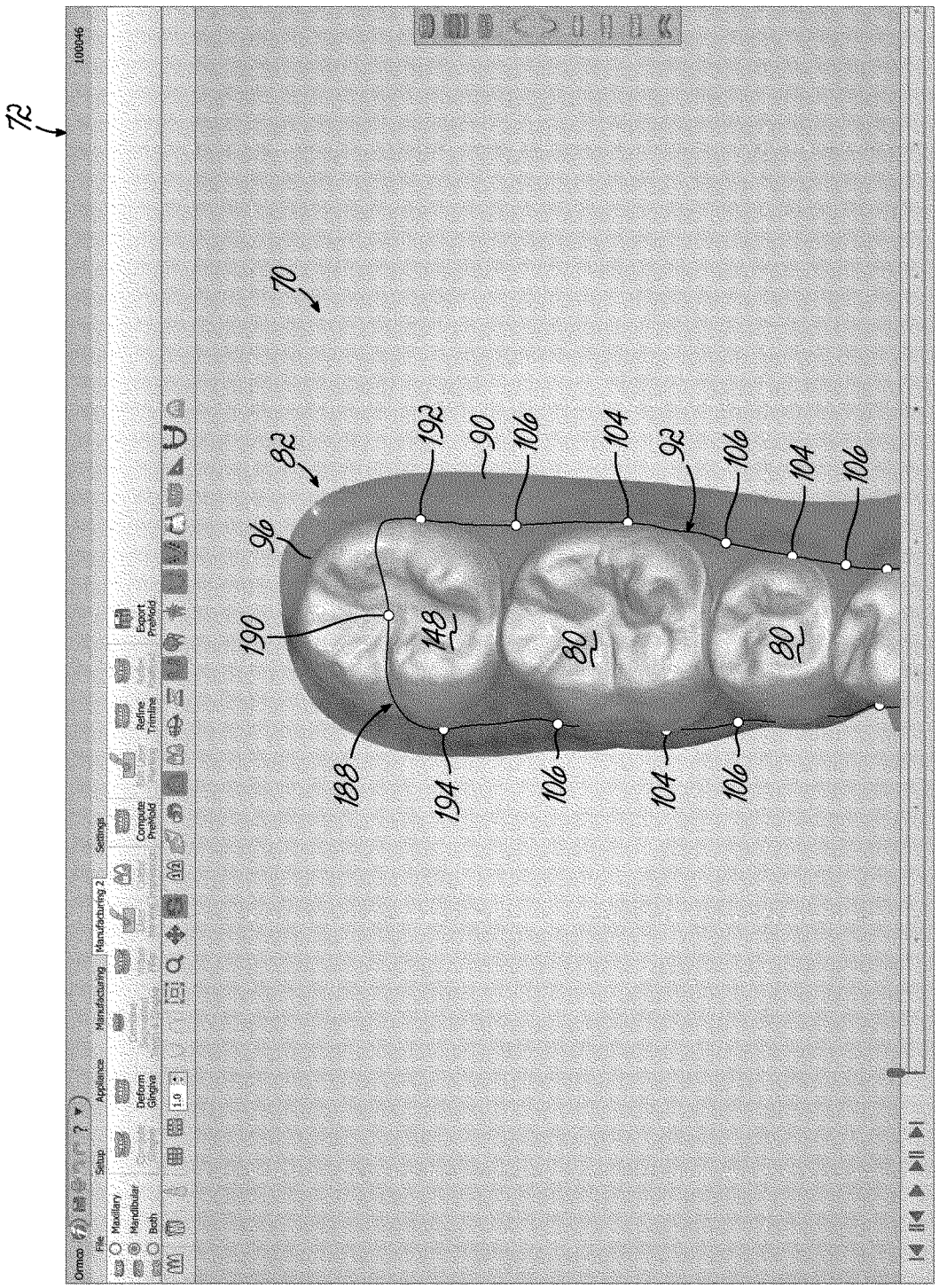
Figure 7:
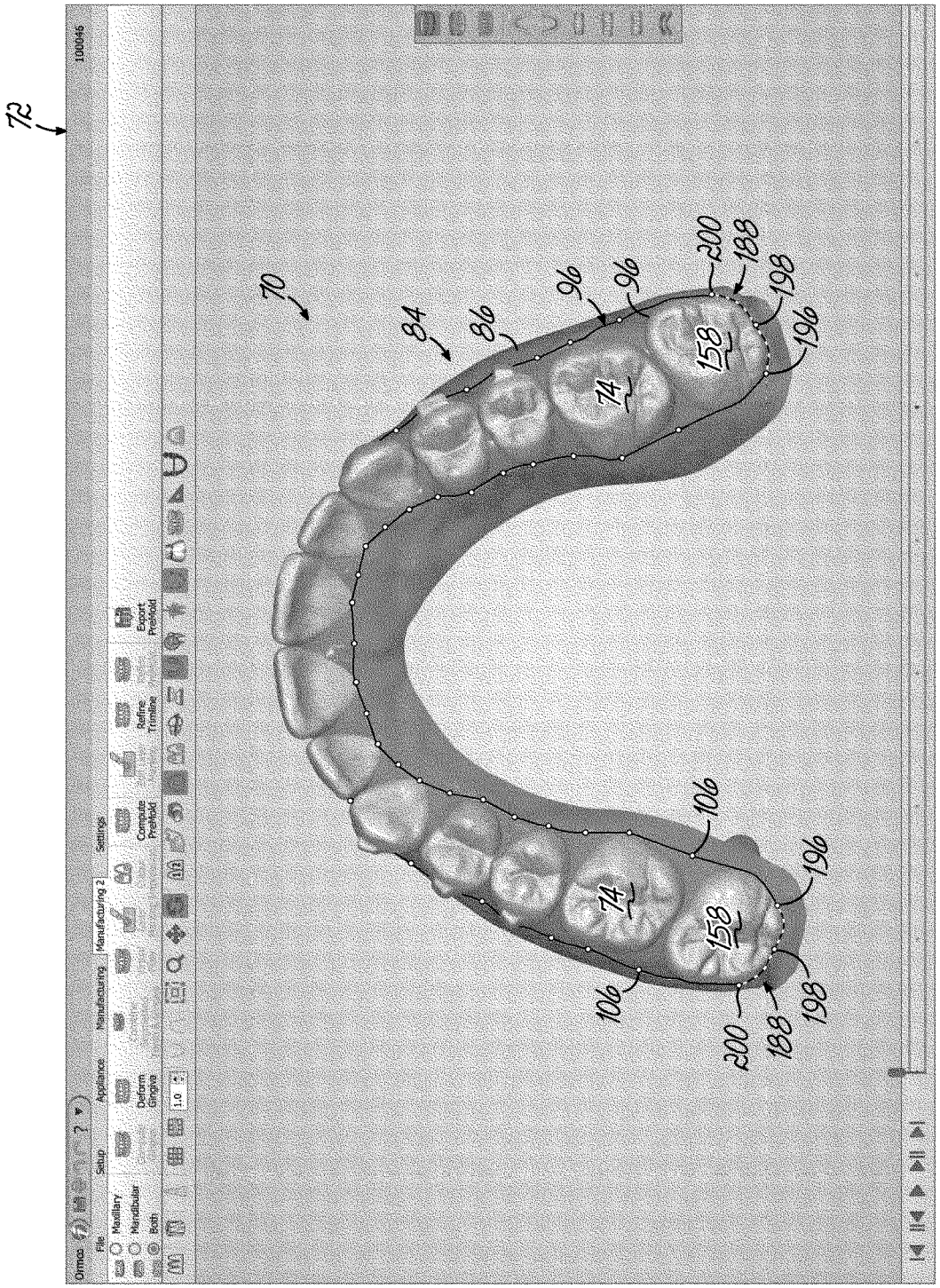

With reference to FIGS. 6 and 7, each digital trimline 92, 94 transitions from its labial location along the respective teeth 74, 80 to its lingual location along the teeth 74, 80 at a molar 148 and 158, respectively. These transitions are generally shown at 188. During any one of steps 102, 118, 120, and 124 in FIG. 2, the clinician can determine whether to edit the transition 188 by orienting the digital trimline 92, 94 around or over the respective molar 148, 158. For example, the digital trimline 92 may follow the tooth curve around the tooth. Alternatively, in FIG. 6, the clinician may add a control point 190 on an occlusal surface of molar 148. Thus, the digital trimline 92 transitions from a control point 192 to the control point 190 on the occlusal surface of the molar 148 to another control point 194 proximate the gingival margin 96 on the opposing side of the molar 148 from the original control point 192. This pathway for the digital trimline 92 in the transition 188 may be the clinician's decision or may be automatic depending on, for example, if the molar 148 is not fully erupted. In that regard, the system 10 may measure the location of the incisal surface of the molar 148 relative to an adjacent molar to determine whether to extend the pathway over or around the molar 148. Alternatively, the system 10 may automatically generate the trimline over or around the molar depending on the location at which the clinician adds a control point, such as control point 190 which would cause the system 10 to extend the trimline 92 over the molar 148.

Rather than go over the molar 148 as is shown in FIG. 6, in one embodiment, the clinician may opt to extend the trimline 94 around the molar 158 proximate the gingival margin 96. This is shown by way of example in FIG. 7. At the transition 188, control points 196, 198, and 200 along the trimline 94 cause it to loop around the molar 158 at a location that generally follows the gingival margin 96. In this case, an aligner made according to the trimline 94 would encapsulate the molar 158 during treatment.

During steps 102, 118, 120, and 124, the clinician may create and edit either one or both of the digital trimline 92 on the lower jaw 82 and the digital trimline 94 on the upper jaw 84 of the 3-D digital model 70.

Referring to FIG. 2, in one embodiment, the system 10 evaluates each edit of the digital trimline 92, 94 against the predetermined parameters to determine if the edits produce problems with the manufacturing of the aligner 32 or with aligner performance. This is referred to as validation. In the exemplary embodiment shown in FIG. 2, after any single one of the steps 118, 120, and/or 124, the system 10 validates the edited trimline 92, 94 at 126. During validation, which may occur continuously in response to each edit of the digital trimline 92, 94, the system 10 evaluates the digital trimline 92, 94 at all locations against a set of predetermined parameters.

By way of example only, and not limitation, the set of predetermined parameters include one or more requirements including that the trimline is a closed curve (i.e., it is a continuous line around the teeth), that the trimline extends tooth-to-tooth (with some exception for teeth that are crowded together) on the tooth and/or gingival surfaces. By way of further example only, and not limitation, other requirements may include that the trimline does not produce a radius that is less that a predetermined value. As an example, a clinical radius of the trimline must be greater than a predetermined minimum value. And, in the interproximal regions, the trimline must produce a radius greater than a minimum value. This curvature is typically concave so that the radius of that curvature must be at least as large as the tool radius so that the tool may physically produce the targeted radius. The orientation of the tool rotational axis at all locations along the trimline should be close to the surface normal at that location. The location of the trimline relative to any attachments or devices must maintain structural integrity of the aligner, and at each interproximal tooth location, the labial-lingual distance between the trimline on the labial surface and the trimline on the lingual surface is defined by the clinician. This facilitates a sufficient structural strength and thus avoids breakage of the aligner during use or day-to-day handling.

Figure 8:
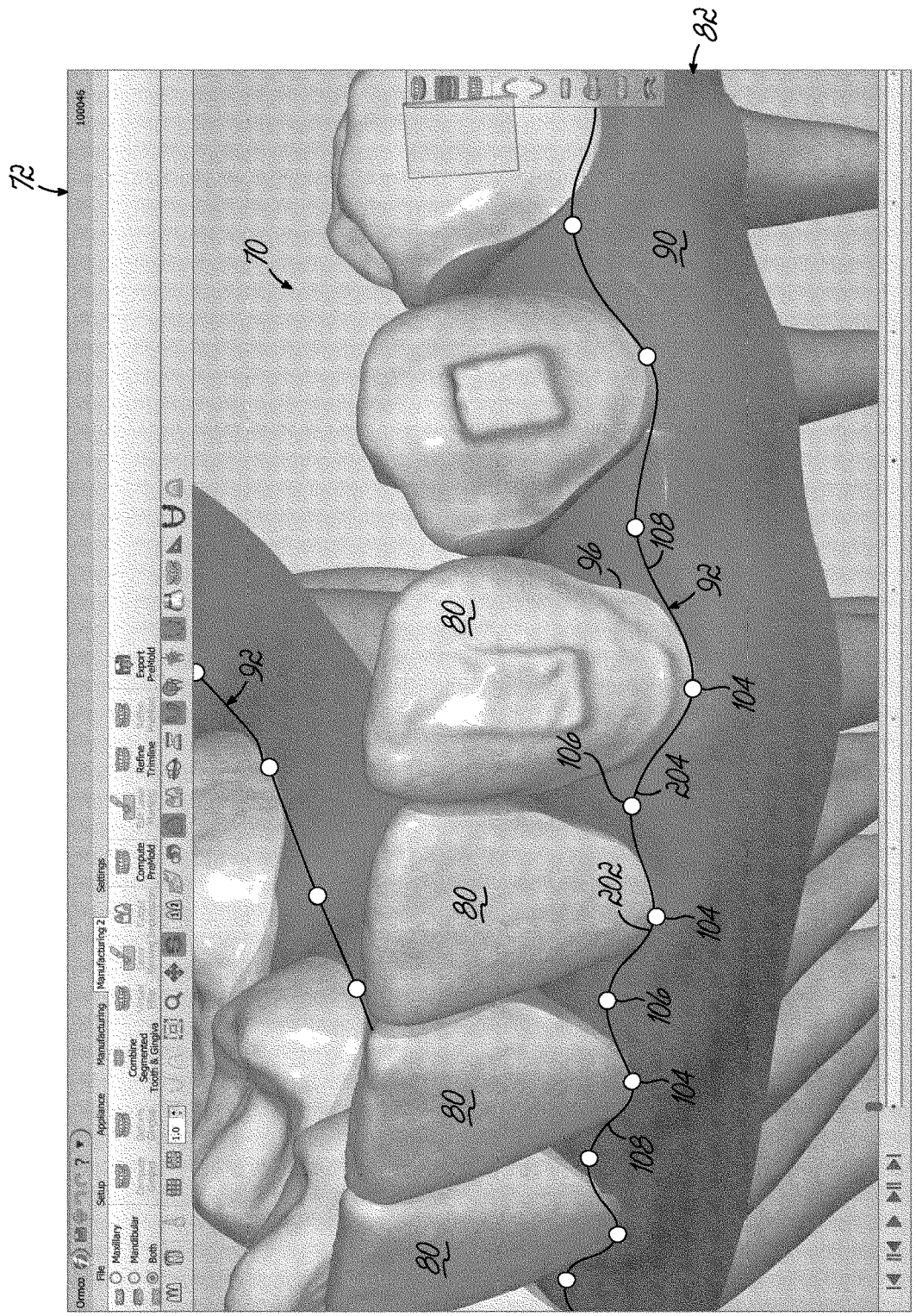

With reference to FIG. 8, an exemplary trimline 92 is shown which satisfies the predetermined parameters. For example, although not shown, the digital trimline 92 is continuous, extends tooth-to-tooth with an alternating concave-convex curve, a radius of curvature at each tooth indicated, for example at 202, produces a scallop of sufficient curvature that is not too sharp, and a radius of curvature at each interproximal location, for example at 204, produces a curvature that is machinable with a selected tool while also not greatly inhibiting the strength of the aligner at that location.

Referring again to FIG. 2, during validation of the trimline at 126, if the system 10 determines that one or more of the predetermined parameters is violated, the system 10 visually indicates that the trimline 94 violates the parameter by, for example, changing the color of the trimline 94. Although color is not shown in the figures, the system 10 may change the line color from green, indicating a valid trimline to another color. For example, if the clinician's edit causes a validation problem, the system 10 alters the color of the trimline or the specific portion that fails validation from green to yellow, from green to orange, or from green to red. The color change may depend upon the severity of the validation issue, with red indicating that that potion of the trimline requires the clinician's further attention. Examples of trimlines that fail validation are shown with reference to FIGS. 5, 9, 10, 11, 12, and 13.

Figure 5:
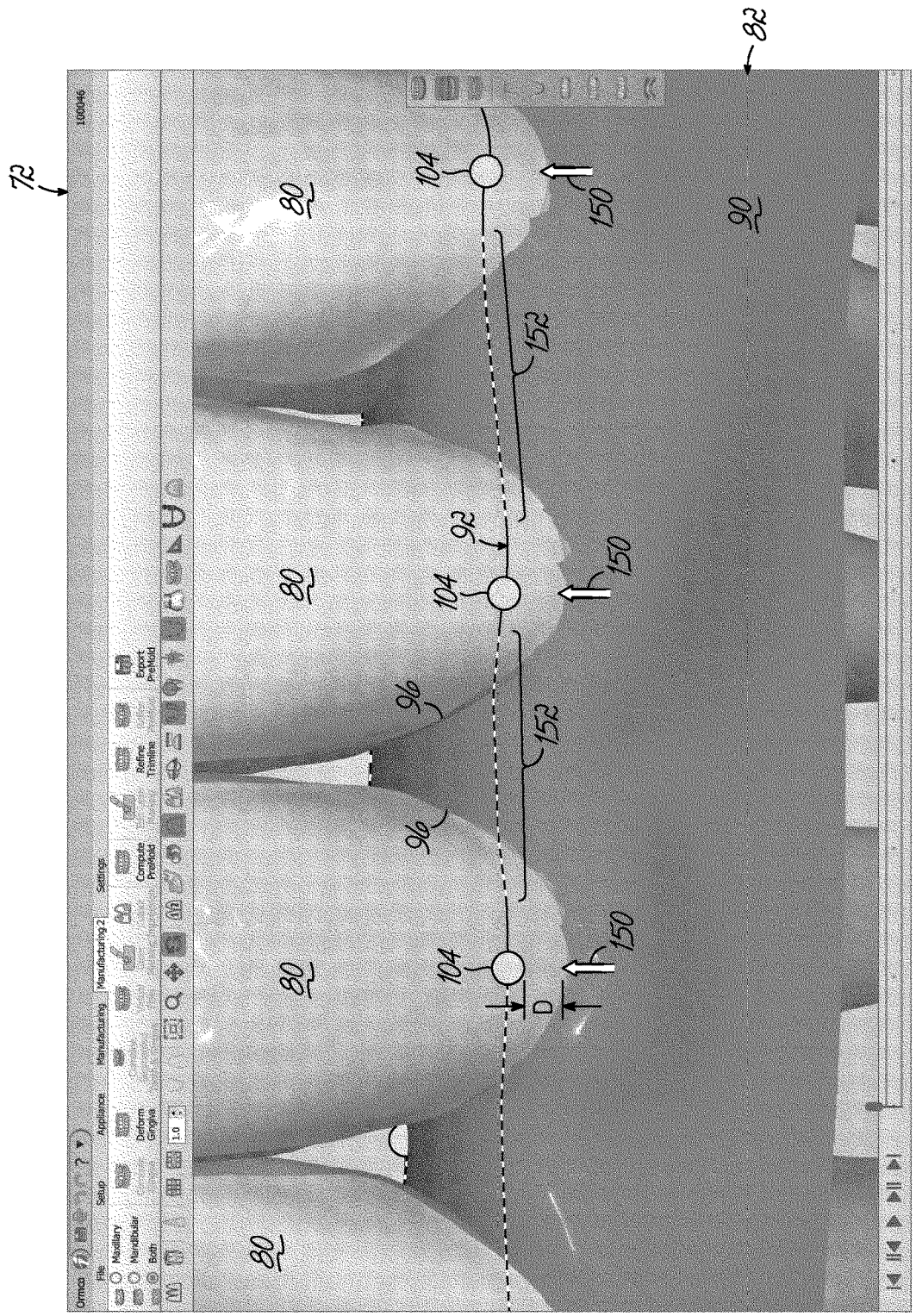
Figure 9:
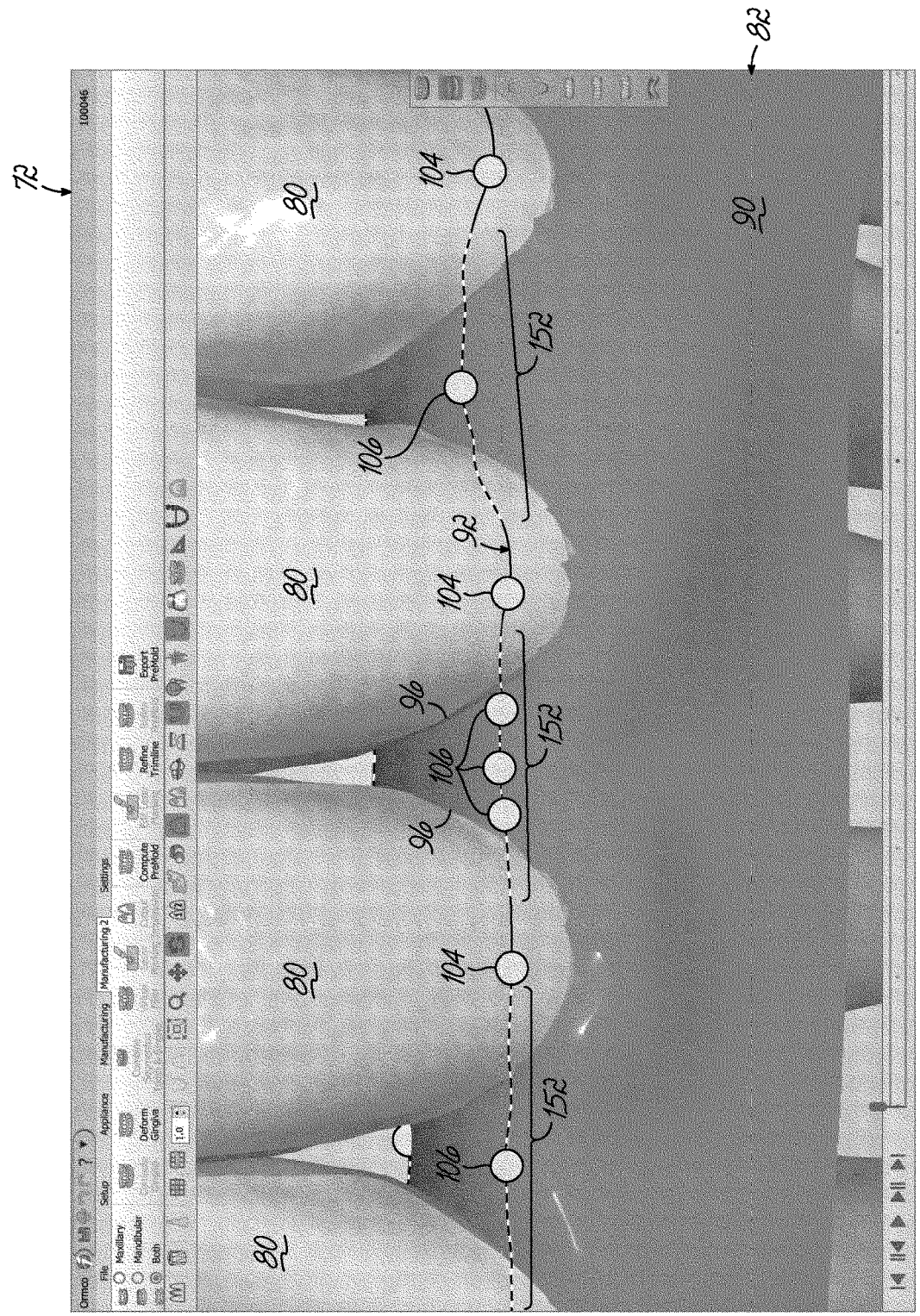

During editing and with reference to FIG. 5, the clinician may adjust the margin amount along the tooth-gingival boundary for each tooth 80 along the mandibular jaw 82, for example. This may be a global modification of the trimline along all teeth in the jaw 82 or selective modification of individual margin points 104 of the teeth 80 in the jaw 82. In FIG. 5, the portions of the digital trimline 92 that fail validation are indicated at 152. For example, the clinician's movement of the digital trimline 92 occlusally to increase the distance of the digital trimline 92 from a gingival zenith by distance D may produce an aligner that is too narrow at the interproximal regions. In this case, an aligner produced with the digital trimline 92 may be prone to breakage during use or have insufficient strength to produce the desired tooth movement. The system 10 indicates that the trimline edit is at least questionable by turning the digital trimline 92 from green to yellow in each of the locations 152. The clinician may then further consider that particular edit. A similar failure is shown in FIG. 9, in which the system 10 changes the color of the trimline 92 at locations 152 to notify the clinician of a likely problem with the aligner in these areas.

Figure 10:
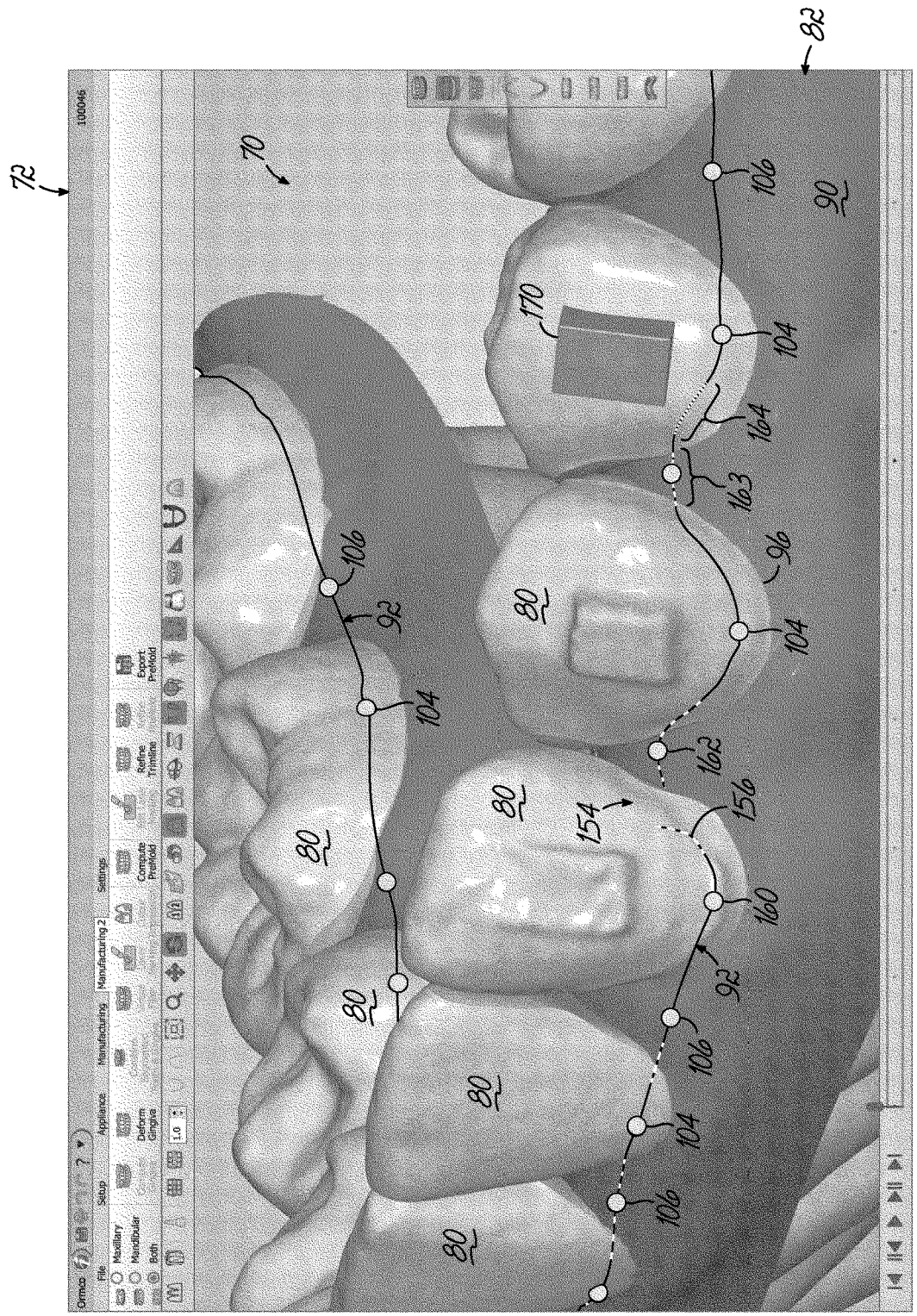

By way of further example only, and with reference to FIG. 10, an edit at 154 produces a break in the spline 156 between the margin point 160 and the control point 162. Because the break at 154 produces an open curve, the digital trimline 92 fails validation. The system 10 may change the color of this portion of the trimline 92 to red. Also shown in FIG. 10, at locations 163 and 164, the system 10 indicates that the digital trimline 92 fails validation. At location 163, the system 10 may indicate that the labial-lingual dimension of the aligner at this location is too thin. This is best shown with reference to FIG. 11. The system 10 indicates that a lingual-most to labial-most distance at each of the interproximal regions 166 and 168 causes the digital trimline 92 to fail validation at 126 in FIG. 2. Depending on the distance, the color of the trimline 92 at 163 may be yellow, orange, or red.

Referring again to FIG. 10, at location 164, the system 10 changes the color of the trimline 92 to notify the clinician that the digital trimline 92 is too close to an attachment 170. This relative location may produce difficulty in machining and/or weakness in the aligner. The clinician, having been notified of the problem, may then modify the digital trimline 92 to address each failure in validation in real time.

Figure 12:
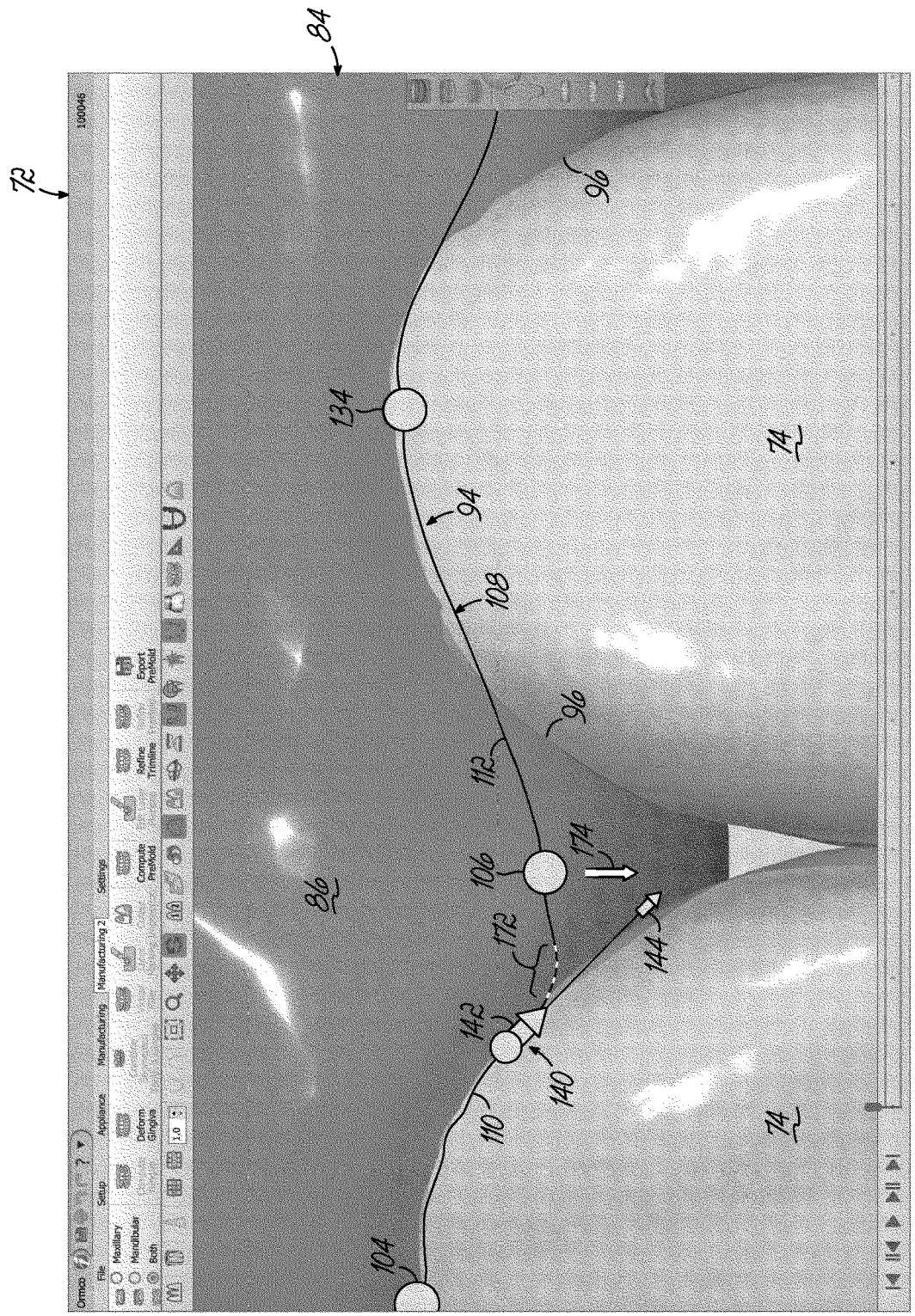
Figure 13:
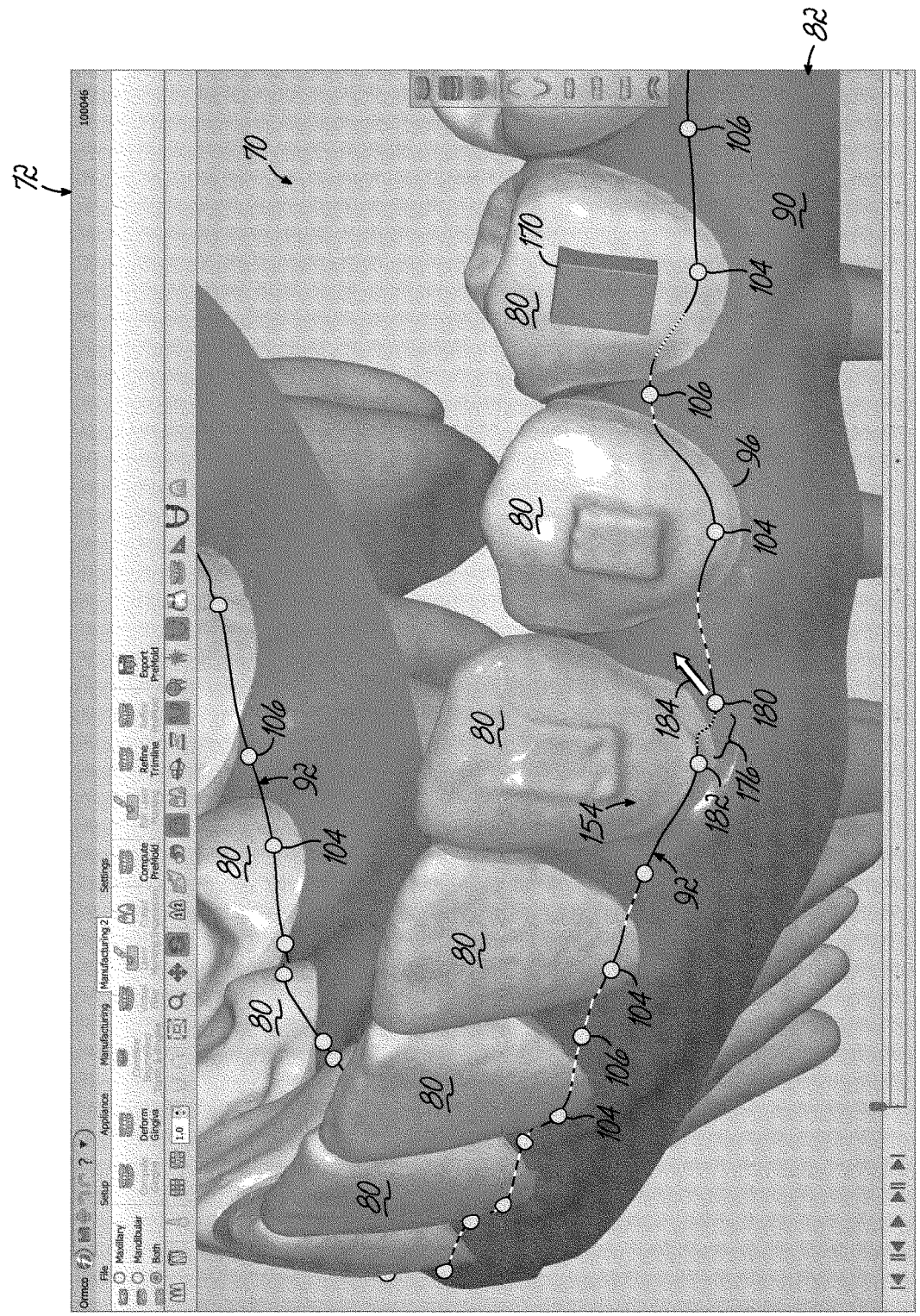

Another example of an edit that causes the trimline to fail validation is shown in FIG. 12. At 172, the digital trimline 92 fails validation. The radius of curvature produced by the vector 140 may be too great so as to cause a validation failure. This radius may be less than the minimum tool radius or less than the minimum clinical radius. In this situation, the clinician may move the control point 106 in the direction of arrow 174 or adjust the vector 140 to increase the radius of the spline 110 in the location of 172. A similar failure exists in the digital trimline 92 shown in FIG. 13. At location 176, the system 10 changes the line color to red to indicate that the concave-convex distortion fails validation. The clinician may address that failure by moving control point 180 relative to the margin point 182 in the direction of the arrow 184.

Figure 11:
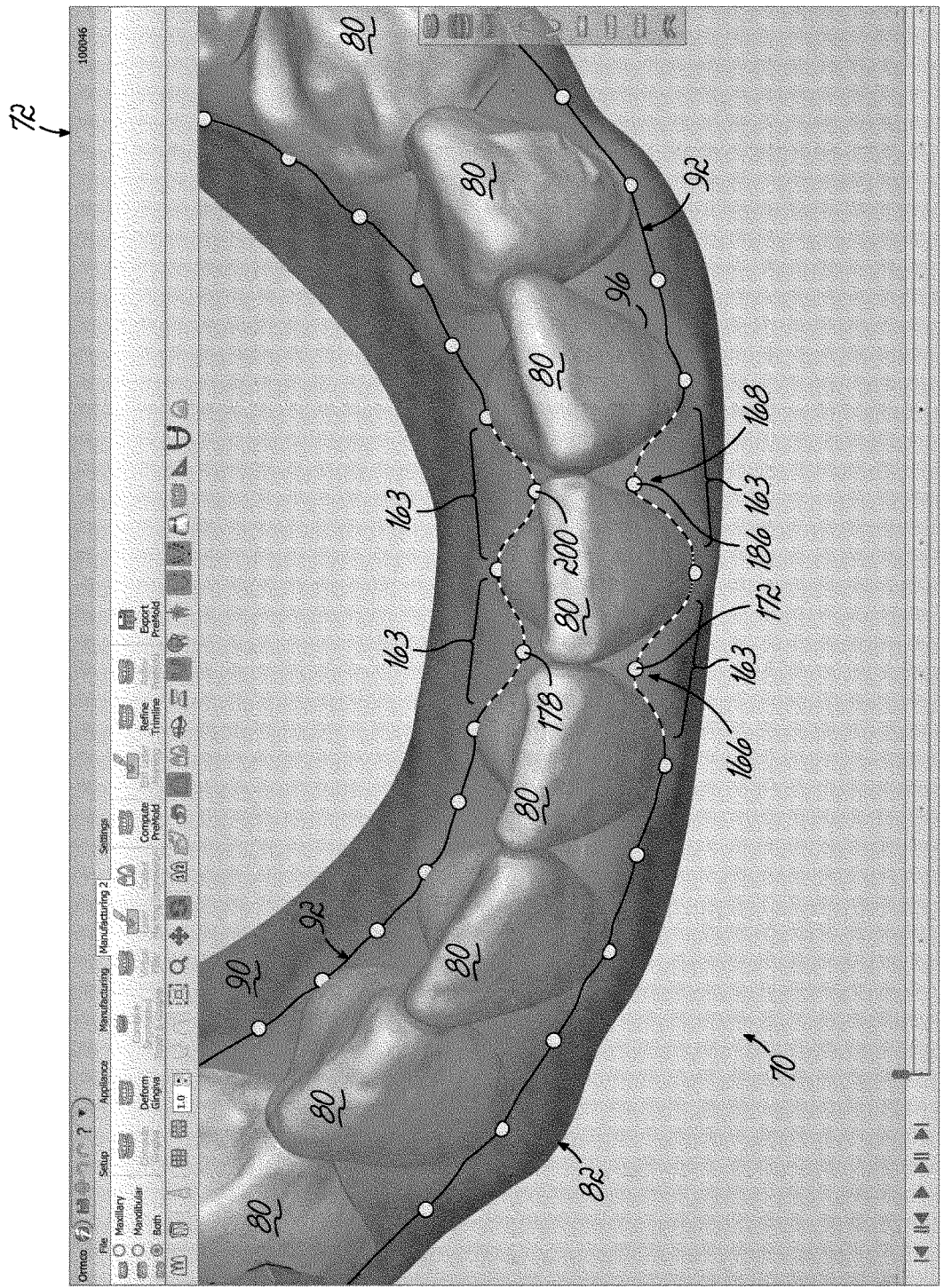

In one embodiment, the system 10 permits replication of portions of the trimline to other locations along the trimline during editing at 124 in FIG. 2. Once the clinician has edited the trimlines 92, 94 at any single tooth so that the trimline 92, 94 is valid for that tooth, that particular geometry may be replicated to other teeth. For example, and with reference to FIG. 11, once a desirable scallop is created for a labial surface of an anterior tooth, that scallop may be replicated to the trimline along the lingual surface of that anterior tooth. In FIG. 11, a desirable scallop created in the interproximal region 166 at the control point 172 may be mirrored to a lingual location 163 to automatically position the control point 178. In addition, the desirable scallop at the control point 172 may be replicated contralaterally to a labial surface of a related anterior tooth to automatically produce the control point 186 and then mirrored to locate control point 200. More specifically, for example, the geometry and location of a labial portion of a trimline for an anterior tooth may be automatically replicated to a lingual portion of the trimline for the anterior tooth and be contralaterally replicated to both the labial and lingual portions of the trimline at one or more adjacent teeth. Advantageously, replication of features from one location on the trimline to another location saves the clinician significant time during editing.

In one embodiment, and with reference to FIG. 2, once each digital trimline 92 and 94 passes validation, additional trimlines may be created and edited for each position of the patient's teeth as determined by the treatment plan. This is indicated at 210 in FIG. 2. This may entail editing additional three-dimensional models of teeth for each of those positions established by the treatment plan. Alternatively, the trimline created for the 3-D digital model 70 at T0, for example, may be morphed throughout each additional three-dimensional model in the treatment plan. In this way, creating and manually or automatically editing a single trimline may facilitate creation of trimlines for the patient's jaw through all subsequent three-dimensional models.

Morphing may take into account changes in the teeth positions at each stage of treatment. The system 10 may automatically adjust the initial, validated trimline to the teeth movement according to the treatment plan. To do so, the system 10 may slide the margin points and control points with the teeth and/or gingiva in response to the desired tooth movement. This may be achieved, for example, in models where the teeth and/or gingiva are defined as point clouds, such as from an original intra-oral scan. Triangles are formed by connecting the points in the point cloud. Each margin point and control point is placed in a selected triangle and the points slide to each new position using the transformations of gingiva defined by the treatment plan. The system 10 may allow the clinician to manually slide margin and control points. Manual sliding may be advantageous in situations where tooth movement causes the location of the trimline following sliding to fail validation or otherwise creates a poorly oriented trimline. The system 10 may automatically morph the automatic and/or manual sliding to the trimlines for all subsequent stages of treatment. The clinician may optionally select to not propagate manual sliding.

In addition to replication and morphing features, the system 10 includes tools that allow the clinician to selectively group various stages of orthodontic treatment and utilize the trimline features for each aligner in that preselected group. For example, if the patient requires 30 aligners for treatment, the clinician may selectively morph the digital trimline 92 and/or 94 for aligners at stage 0 to aligners for stages number 1 through number 10. Similarly, the clinician may morph the trimlines for aligners at stage 11 through stage 20, and the clinician may morph trimlines for aligners at stage 21 through aligners for stage 30. With the availability of these tools, the system 10 advantageously reduces the time required to produce a trimline for each aligner at each stage of treatment.

As is shown in FIG. 2, following morphing of an edited trimline that passes validation, those trimlines that are created from morphing may each be edited and validated in accordance with editing and validation described above. Thus, each trimline for each aligner is subject to validation and further editing where necessary or desirable.

Following creation, editing, and validation, the digital trimline 92, 94 is applied in the manufacturing of one or more aligners. To that end, in FIG. 2 at 212, the digital trimline 92, 94 is translated to machine code for use with the CNC machinery 26 or robot for a trimming process that cuts the aligner 32 (shown in FIGS. 1A and 18) from a workpiece. The machine code may be written to flash memory, cache memory, and/or data storage devices such as a hard drive, optical drive, tape drive, volatile or non-volatile solid state device, or any other device capable of storing data prior to being utilized by the CNC machinery 26.

Figure 14:
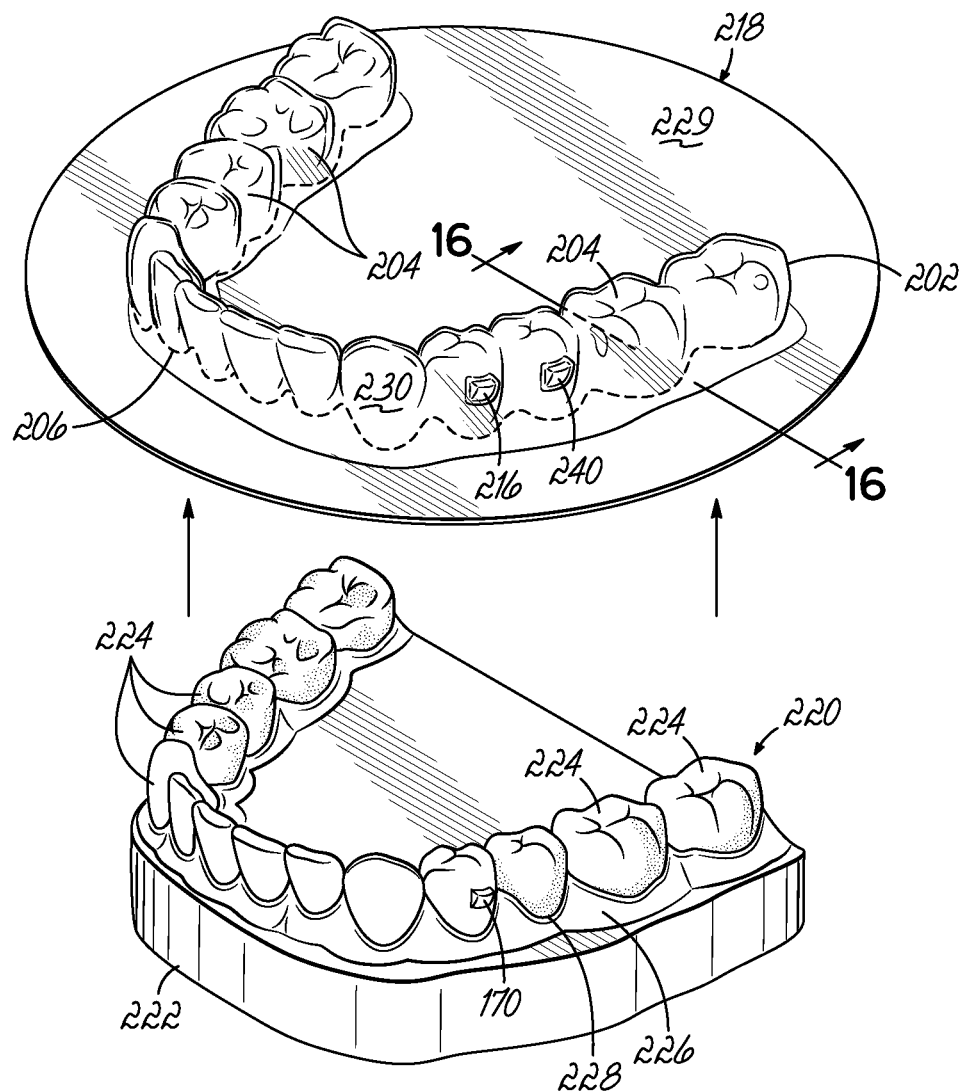
FIG. 14 is a perspective view of a mold and a workpiece following forming in one embodiment of manufacturing an aligner.
Figure 15:
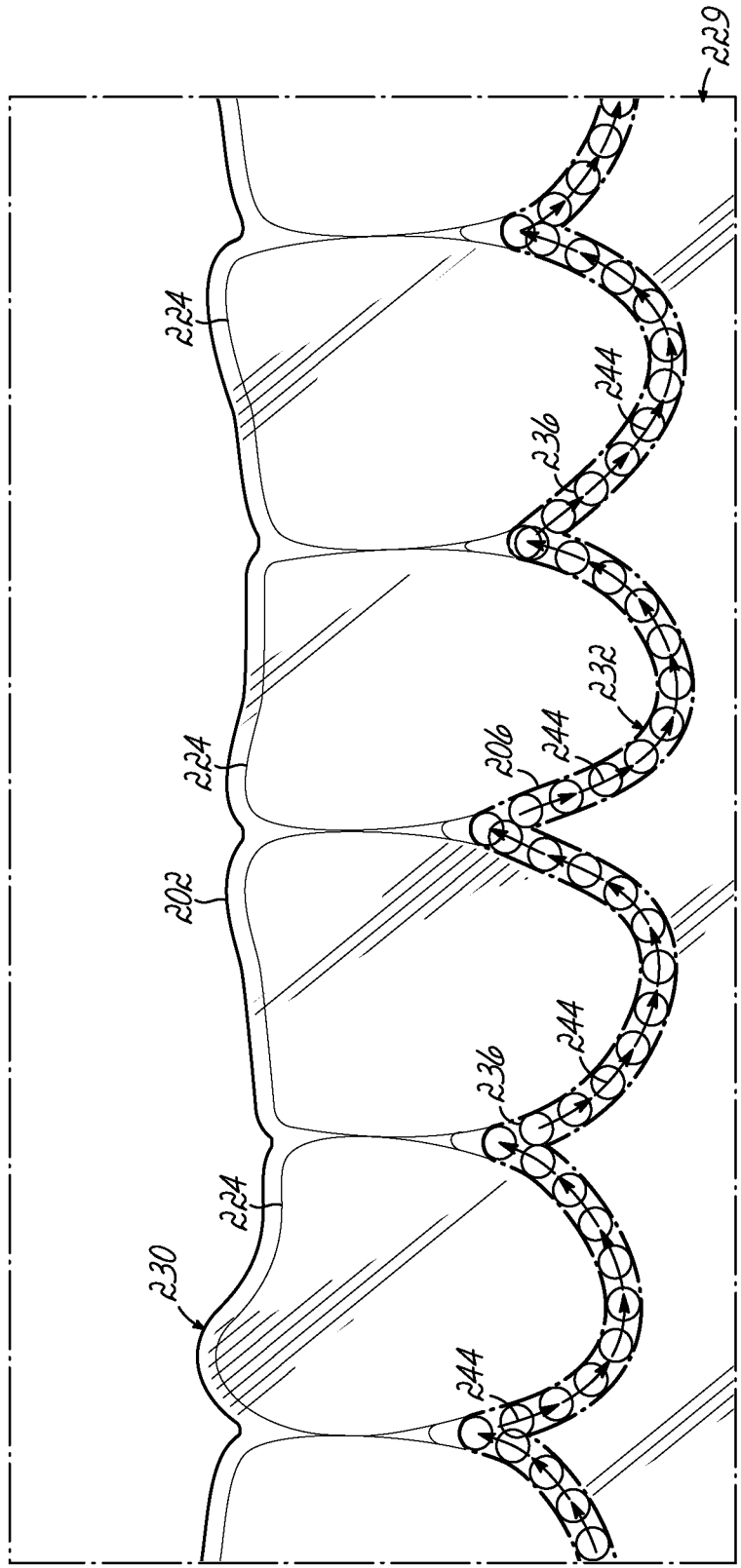
FIG. 15 is a schematic view of a tool path to define an edge of an aligner during trimming according to one embodiment of the invention.

With reference to FIGS. 14 and 15, an exemplary process of forming the aligner 32 may include deforming a workpiece 218 with a mold 220. Although not shown, the mold 220 may be one of a series of molds each fabricated based on a corresponding computer model of the patient's dentition (e.g., the 3-D digital model 70 may be utilized to produce the mold 220) and each mold captures a target orientation of the patient's teeth during orthodontic treatment. For example, a series of computer models provides incremental steps from T1 to one or more intermediate dentition models and ending with the target dentition T2 are generated and may be used to produce corresponding molds.

In the exemplary embodiment shown in FIG. 14, each mold 220 may include a base 222 that supports a plurality of projections in the form of model teeth 224 that extend from a model gum 226 and defines a gingival margin 228. For example, the teeth 224 and model gum 226 may correspond to the teeth 80 and gingiva 90 in 3-D digital model 70 (FIG. 1). Each model tooth 224 may have an orientation that produces a corresponding cavity 204 in the aligner 32 with the gingival margin 228 ideally providing a limiting boundary for the location of the edge 206 of the aligner 32.

Figure 16:
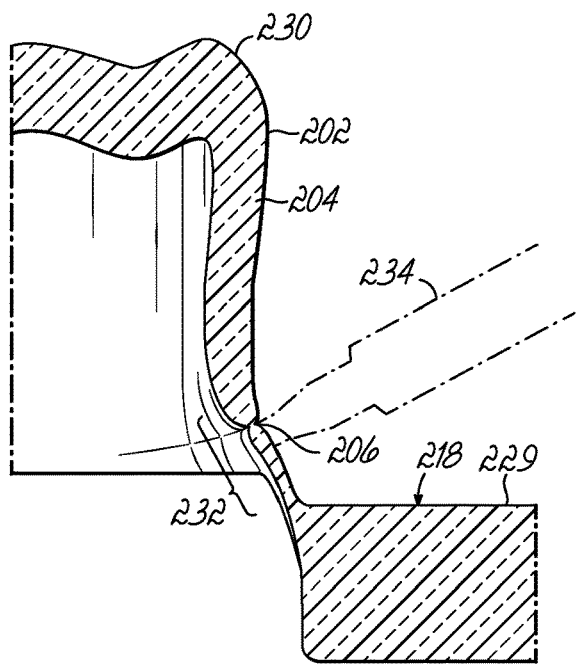
FIG. 16 is a schematic cross-sectional view of a trimming process according to one embodiment of the invention.
Figure 17:
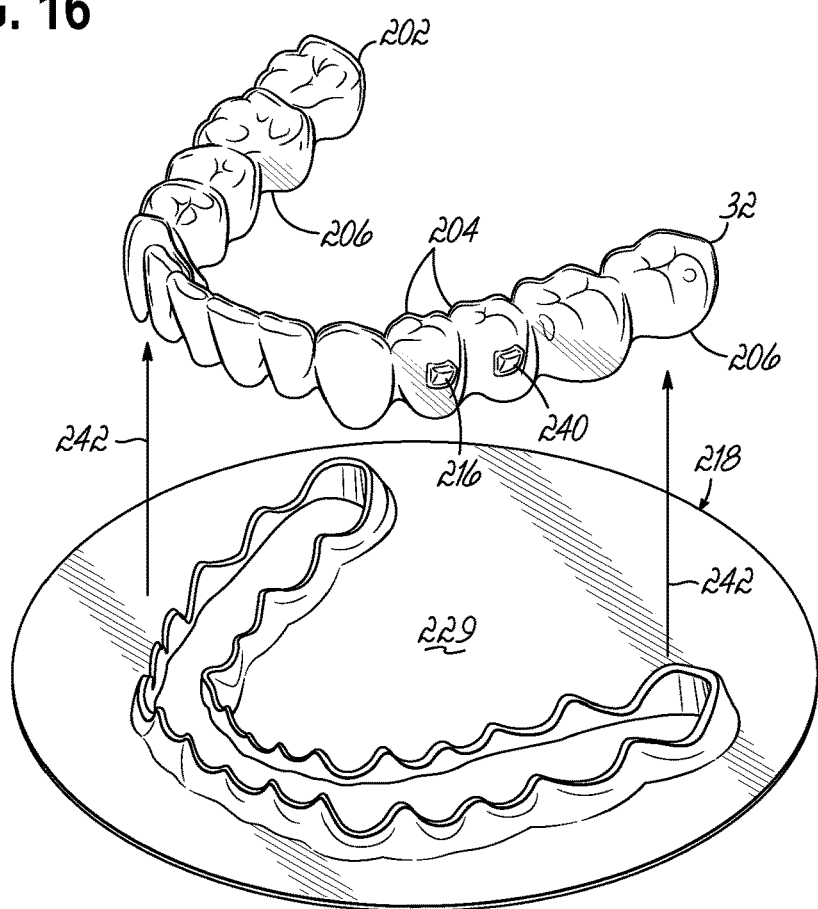
FIG. 17 is a perspective view of separation of an aligner following trimming.

In FIG. 2, forming and trimming each aligner is shown at 214 and may be accomplished with the forming machinery 34 and CNC machinery 26 of the manufacturing system 30 shown in FIG. 1A. In that regard, with reference to FIGS. 14-17, following deforming of the workpiece 218, as is generally shown in FIG. 14, a waste portion 229 of the deformed workpiece 218 is separated from an aligner portion 230 of the workpiece 218 by cutting a region 232 between the two. As is shown in FIGS. 15 and 16, a machine tool 234, which may be coupled to a robot or another machine (e.g., the CNC machinery 26 of FIG. 1 or a milling machine) that is computer controlled, may be used to cut away the region 232 to produce the edge 206 on the aligner 32. The machine tool 234 has a tool radius 236 that defines the edge 206. During machining, the tool 234 follows a tool path 244 to produce the edge 206. According to embodiments of the invention, the tool path 244 is machine code based on the digital trimline, for example, trimline 92. In this way, the edge 206 substantially corresponds to the digital trimline. With reference to FIG. 17, once the machine tool 234 completes removal of the region 232, the aligner 32 is separated from the waste portion 229 of the workpiece 218 according to arrows 242.

Figure 18:
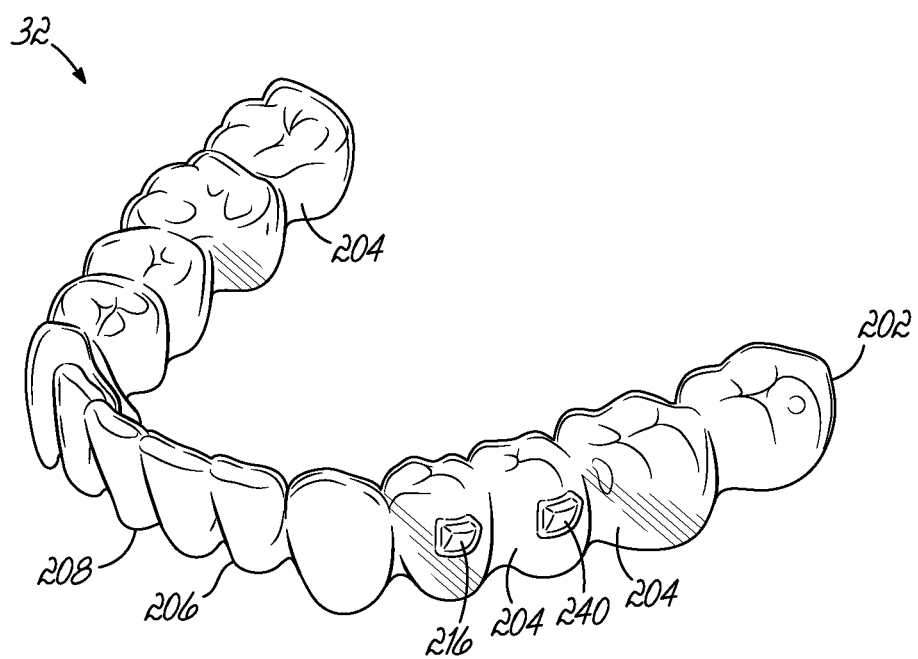
FIG. 18 is a perspective view of an aligner manufactured according to embodiments of the invention.

With reference to FIG. 18, as a result of the method, the aligner 32 includes a hollow shell 202 that is configured to encapsulate one or more crowns of a patient's teeth. The shell 202 is formed with a plurality of cavities 204 that collectively define an edge 206, which defines an opening 208. Each cavity 204 is shaped to receive a specific one of the patient's teeth through the opening 208 during use of the aligner 32. The shell 202 is made of an elastic material in one or more layers and may include one or more receptacles 216 that are configured to receive an attachment 170 (e.g., shown in FIG. 13 and on model in FIG. 14) on the patient's tooth and/or one or more devices 240 in the aligner 32. The receptacle 216 and/or device 240 results in a bulge or discontinuity in the surface of the shell 202. Depending on the placement, the receptacle and/or device may create an issue for machining the edge 206. For this reason, embodiments of the invention address difficulties associated with attachments and/or devices in advance of machining of the workpiece, as is described above.

Although not shown, by way of example only and not limitation, attachments may include an engager, such as a small protrusion of dental bonding material, that is placed at specific locations on selected teeth. The attachment may be any of a variety of shapes including rectangular, square, circular, ellipsoidal, or triangular in shape. The receptacle 216 may be sized to receive at least a portion of the attachment during orthodontic treatment and provide a specific predetermined force via the attachment on the corresponding tooth or on another tooth engaged with the aligner 32 during treatment.

Devices 240 may include sensors, such as pressure sensors, humidity sensors, pH sensors, and any single one of the sensors identified in commonly owned U.S. Pat. No. 10,603,137, which is incorporated by reference herein in its entirety, to name only a few. Other examples of devices 240 include light sources. For example, the light source may include an array of diodes (not shown) that are configured to emit infrared light and/or light of other wavelengths. The diodes may be, for example, light emitting diodes (LEDs), surface mounted diodes (SMDs), or Schottky diodes and may be connected in series or in parallel. In another example, the light source may include an organic light emitting diode (OLED); a polymer-light emitting electrochemical cell (LEC); a laser diode, or an optoelectronic device that can source, detect, and control light; or a polymer LED. By way of further example, the device 240 may include a power source.

During orthodontic treatment, the aligner 32 is selectively positioned over the patient's teeth and any attachments 170 and may fit tightly within the receptacle 216 at least partly due to slight differences in the position of one or more of the cavities 204 relative to the corresponding tooth. A forcible contact with the aligner 32 may move the patient's teeth toward a predetermined position according to a patient's treatment plan that may ultimately end at T2. A set of aligners (not shown) may include one or more aligners 32. During orthodontic treatment, each stage of treatment may include an aligner that provides slightly different movement of the patient's teeth. The individual aligners are utilized in a predetermined sequence to complete orthodontic treatment or move the patient's teeth to T2. Accordingly, each aligner in the series may move one or more teeth a prescribed amount. While similar, each aligner is slightly different in shape. Cumulatively, these individual amounts may result in complete treatment of the patient's malocclusion.

As is described above, according to embodiments of the invention, a practitioner implements the computer 12 (e.g., shown in FIGS. 1A and 19) with software capable of generating and manipulating the 3-D digital model 70 in accordance with the system 10 described above.

Figure 19:
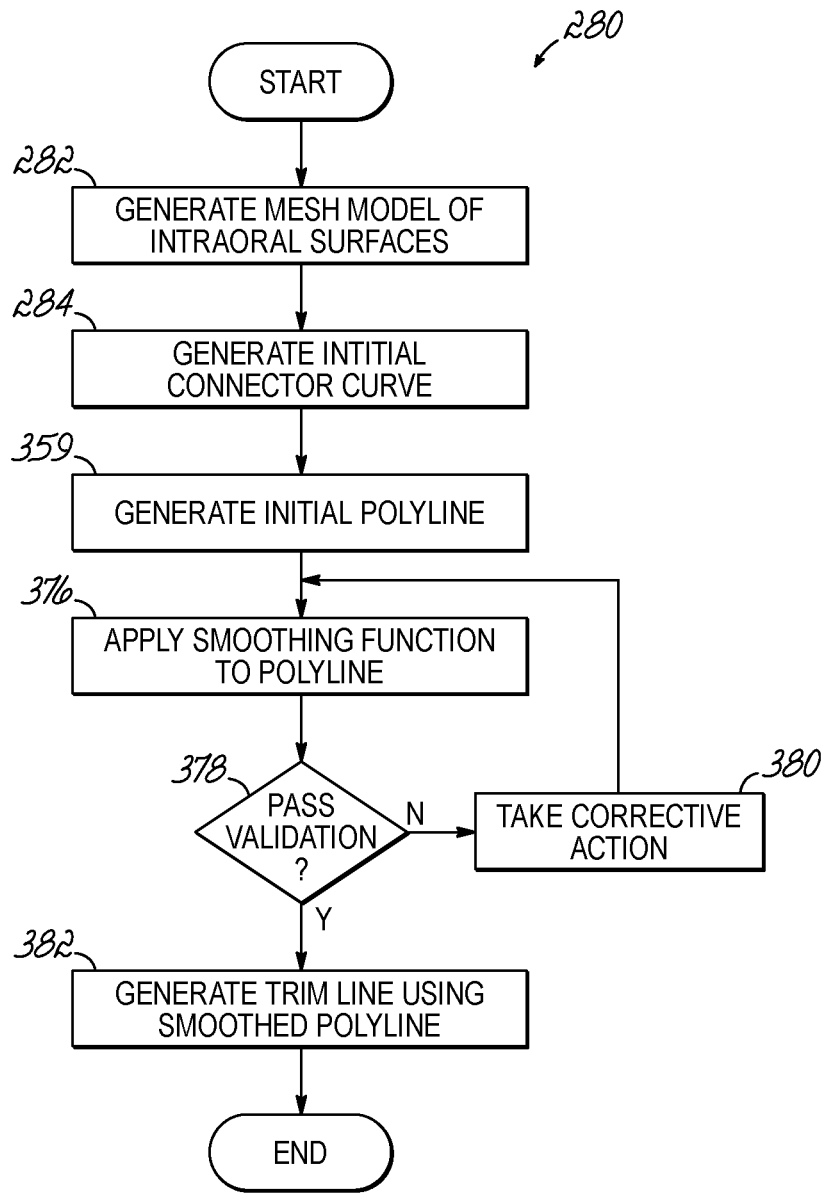
FIGS. 19 and 20 are flow charts of additional processes which may be used in developing a trimline for an aligner.
Figure 20:
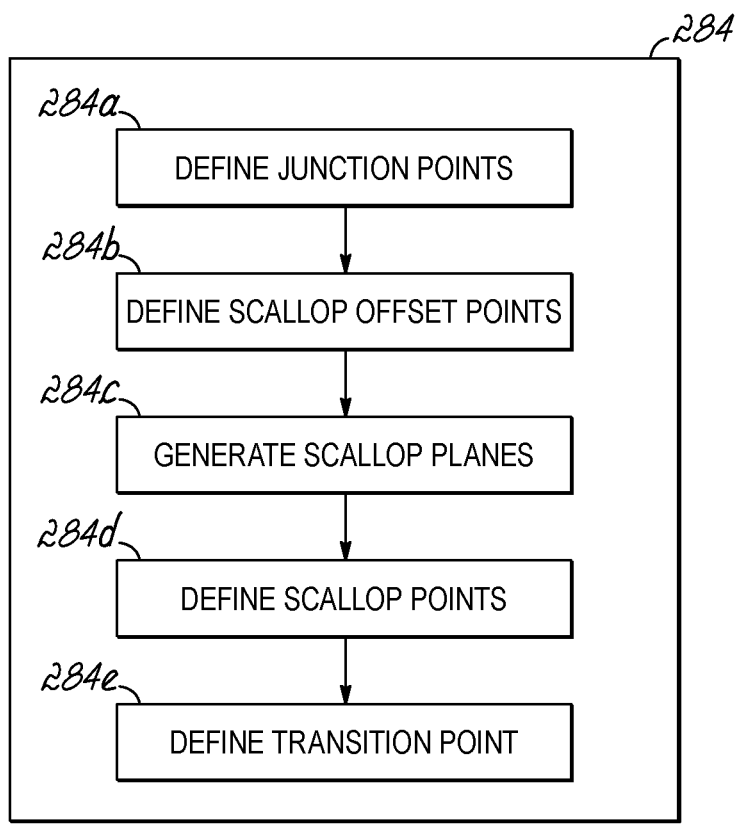

FIGS. 19 and 20 illustrate flowcharts depicting an exemplary process 280 and sub-process 284 that may be used for defining digital trimlines 92, 94 in accordance with an embodiment of the invention. The process 280 and sub-process 284 are described below with respect to defining a trimline for one of a plurality of 3-D stitched digital models. However, it should be understood that these processes may be applied to each of the stitched digital models.

Figure 20A:
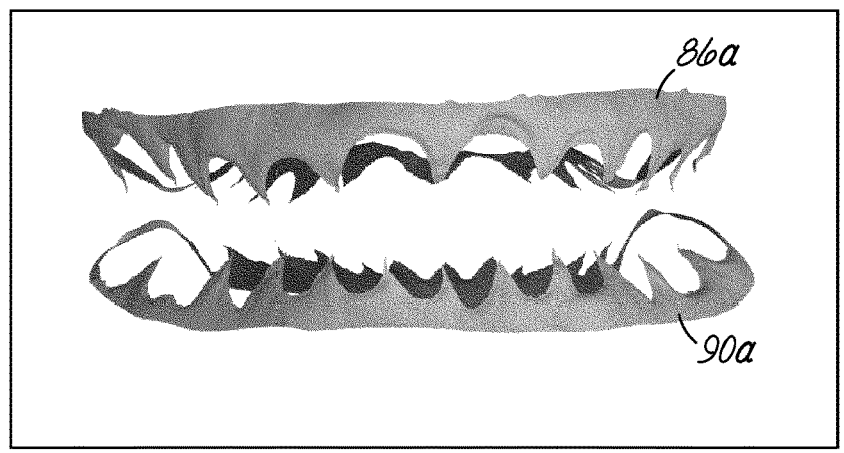
FIG. 20A is a perspective view of an upper and a lower segmented modeled gingiva.
Figure 20B:
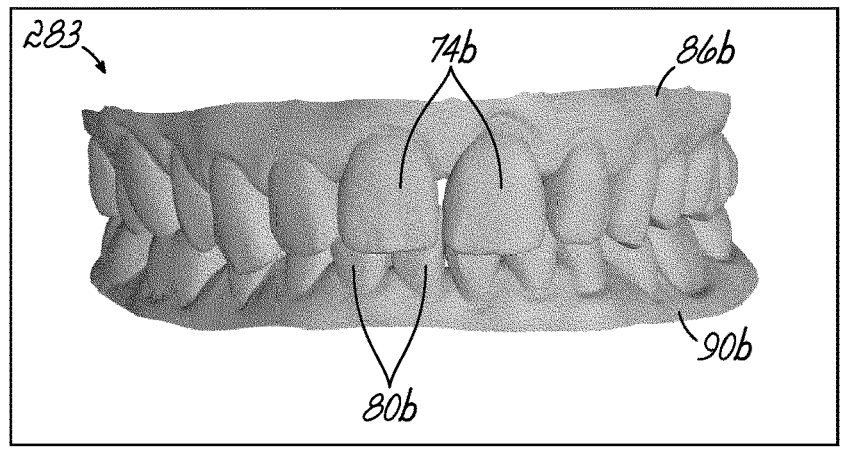
FIG. 20B is a perspective view of a stitched digital model including the segmented modeled gingiva of FIG. 20A stitched to segmented modeled teeth.
Figure 20C:
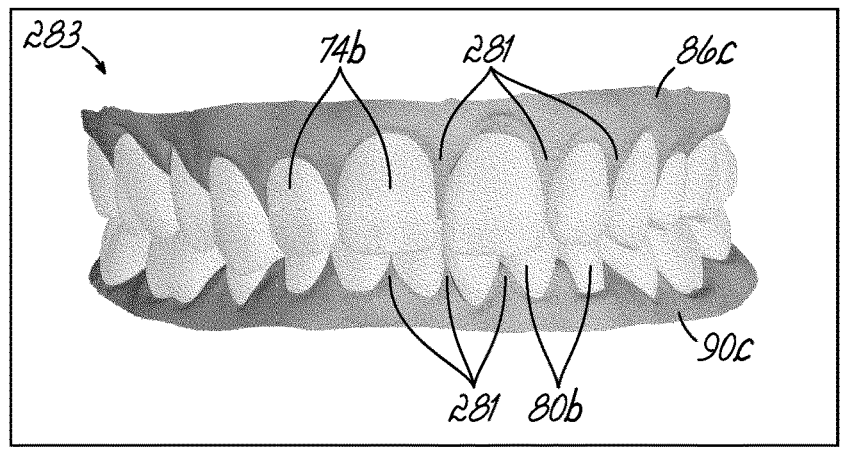
FIG. 20C is a perspective view of the stitched digital model of FIG. 20B in which gaps between the modeled teeth have been filled in to extend the interproximal areas of the modeled gingiva.

Each stitched digital model may correspond to a stage of treatment from a first stage (stage 1) to a final stage (stage n). The stitched digital models may be generated by segmenting the modeled teeth 74, 80 from the modeled gingiva 86, 90 of an initial stage (stage 0) digital model prior to treatment, e.g., the 3-D digital model 70. FIG. 20A illustrates segmented modeled gingiva 86a, 90a for the 3-D digital model 70 without the modeled teeth 74, 80. The orientations of the segmented modeled teeth (not shown) may then be incrementally adjusted to generate a set of modeled teeth for each stage of treatment. A segmented modeled gingiva may be generated for each stage of treatment by morphing the segmented modeled gingiva 86a, 90a from the initial 3-D digital model to match the positions of the modeled teeth for that stage. Referring to FIG. 20B, each morphed segmented modeled gingiva 86b, 90b may be stitched to its corresponding set of modeled teeth 74b, 80b. As shown by FIG. 20C, gaps in the interproximal areas 281 between adjacent teeth 74b, 80b may be filled in to extend the modeled gingiva 86c, 90c into previously empty regions between adjacent teeth 74b, 80b, thereby completing a 3-D stitched digital model 283 for that stage of treatment. The resulting stitched digital model 283 may be the same as or similar to a 3-D digital model of a positive mold over which an aligner is formed. Because the stitched digital model 283 is a virtual representation of the positive mold, it may provide a more accurate model surface on which to construct a trimline and allows the construction to be automatic once predetermined parameters are established.

In block 282, the process 280 generates a polygon mesh from the stitched digital model 283 using a process commonly known as tessellation. The mesh may include a plurality of vertices and edges, with each mesh vertex defining a position in the virtual space, and each edge connecting two mesh vertices. Each closed set of edges may define a face, such as a triangular face, that represents a portion of a larger modeled surface. The mesh may thereby provide a digital model of certain intraoral surfaces, such as gingival surfaces of the modeled gingiva 86, 90 and enamel surfaces of the modeled teeth 74, 80. These intraoral surfaces may include, for example, labial, lingual, occlusal, and interproximal regions. The interproximal regions may be between two teeth or adjacent to any tooth, and may be artificially generated. The mesh may be generated from a point cloud of the stitched digital model 283, with each mesh vertex corresponding to a point of the point cloud. The mesh vertices may be connected by edges in such a way that the faces of the polygons are consistent with the intraoral scan imagery and/or stitched digital model 283. The mesh may differ from the intraoral scan imagery by including additional data. This additional data may define features such as virtual filler (e.g., interproximal region fillers), and artificial ridge, crown, and gingival surfaces, or any other surface that may contact the aligner, such as the surface of a pontic or other artificial tooth.

Figure 23:
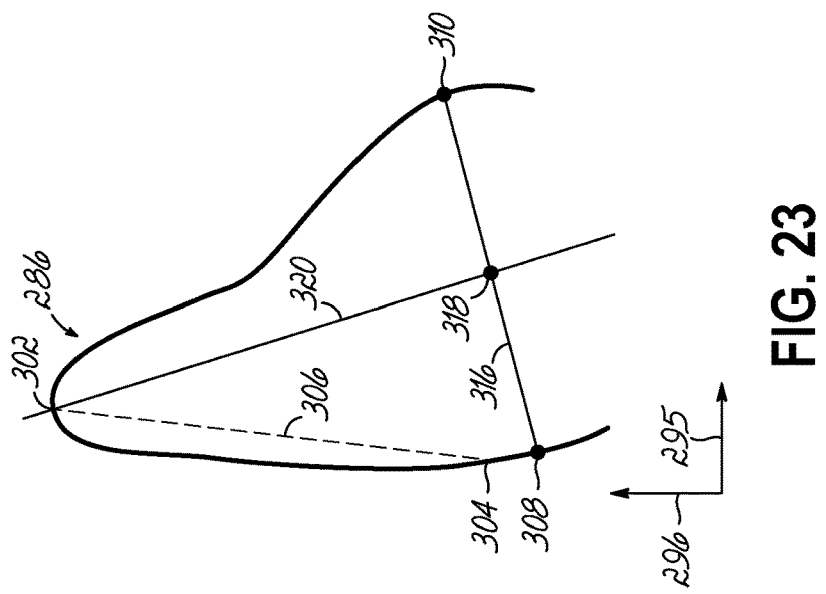
FIGS. 21-23 are diagrammatic views of a tooth depicting one or more landmarks that may be used by the processes of FIGS. 19 and 20.
Figure 22:
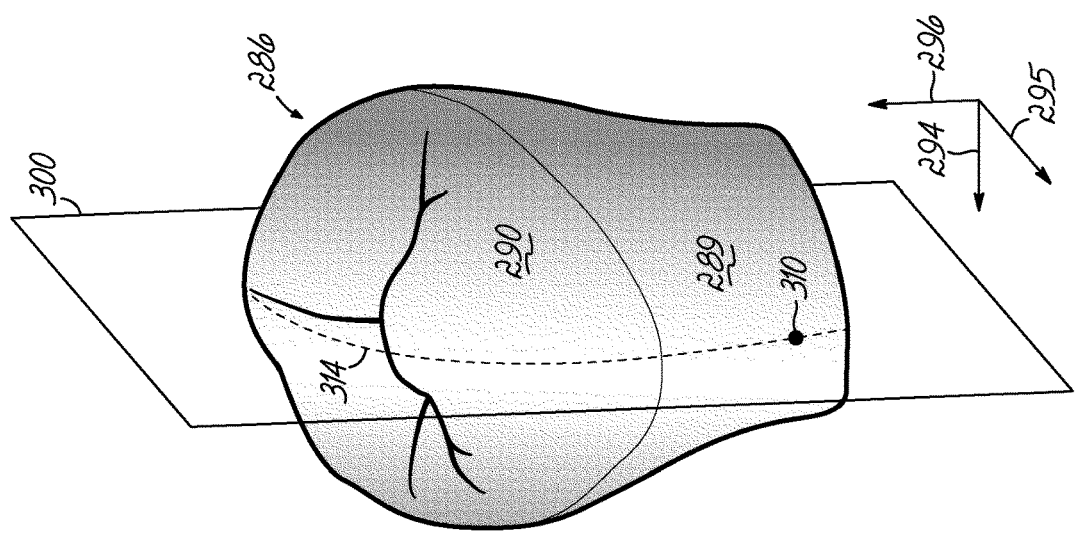
Figure 21:
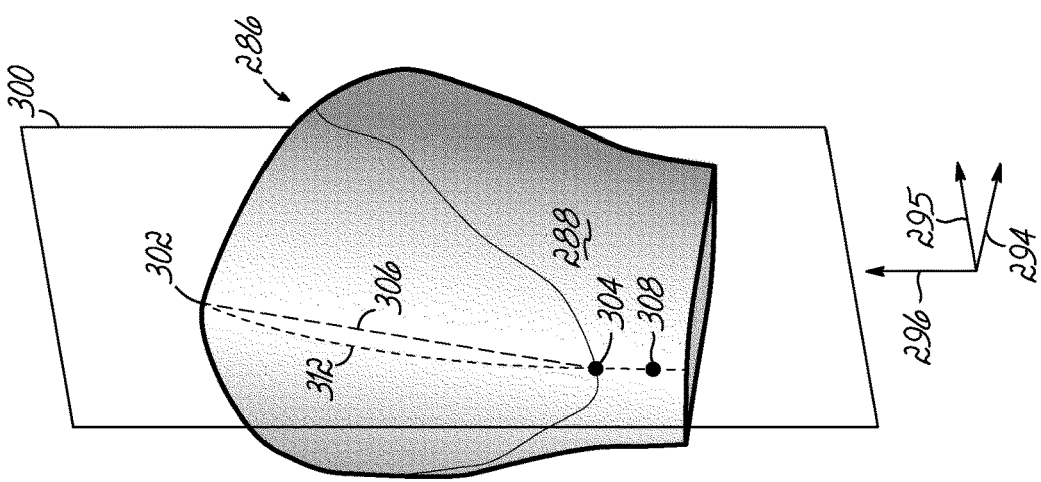

In block 284, the process 280 generates one or more initial connector curves 100 that can be used to form the digital trimline 92, 94. Referring now to FIG. 20, a connector curve sub-process is depicted that may be used to generate the initial connector curves in block 284. In block 284a of the sub-process, the sub-process defines a facial enamel-gingival junction point (FEGJ.Pt) on the facial/labial surface of a model tooth, and a lingual enamel gingival junction point (LEGJ.Pt) on the lingual surfaces of the model tooth. This virtual construction process may be performed on each tooth in each of the upper and lower jaws. To this end, the sub-process may define one or more reference axes or other landmarks to locate one or both of the FEGJ.Pt and LEGJ.Pt for each tooth. This process is illustrated in FIGS. 21-23, which present a labial view, a lingual view, and a cross-sectional view, respectively, of an exemplary model tooth 286 comprising an object in the stitched digital model 283 for which these landmarks may be defined. In the exemplary model tooth shown, the surfaces of the model tooth 286 may include a labial surface 288, a lingual surface 289, and an occlusal surface 290.

With reference to FIGS. 21 and 22, the sub-process may define a mesial-distal axis 294 that is parallel to a labial-incisal edge of the model tooth 286. A labial-lingual axis 295 that is perpendicular to the mesial-distal axis 294 may also be defined. A vertical axis 296 may then be defined that is perpendicular to both the mesial-distal and labial-lingual axes 294, 295.

The sub-process may further define a mid-developmental lobe plane 300 by selecting an incisal end point 302 and a gingival end point 304 of a mid-developmental lobe axis 306. The mid-developmental lobe plane 300 may be defined as a plane that passes through the mid-developmental lobe axis 306 and which is parallel to the labial-lingual axis 295. Enamel-gingival junction points 308, 310 may then be defined on the labial and lingual surfaces 288, 289 of model tooth 286 by the intersection of the mid-developmental lobe plane 300 and the labial and lingual gingival margins 96, respectively. The intersection of the mid-developmental lobe plane 300 with the enamel surfaces (e.g., labial surface 288 and lingual surface 289) of model tooth 286 may define a labial path 312 and a lingual path 314, respectively, of model tooth 286.

As best shown by FIG. 23, the labial-enamel-gingival junction point 308 and lingual-enamel-gingival junction point 310 may define a crown-gingival line segment 316. The mid-point of the crown-gingival line segment 316 may in turn define a cervical-center-point 318 of model tooth 286. A line segment in the mid-developmental lobe plane 300 that passes through the cervical-center-point 318 and which extends occlusally above the model tooth 286 may define a crown-long axis 320 of model tooth 286. Methods of identifying tooth landmarks such as the mid-developmental lobe plane, enamel-gingival junction points, and crown-long axis are described in detail by U.S. Pat. No. 9,844,419, which is assigned to Ormco Corporation and incorporated by reference herein in its entirety.

Figure 24:
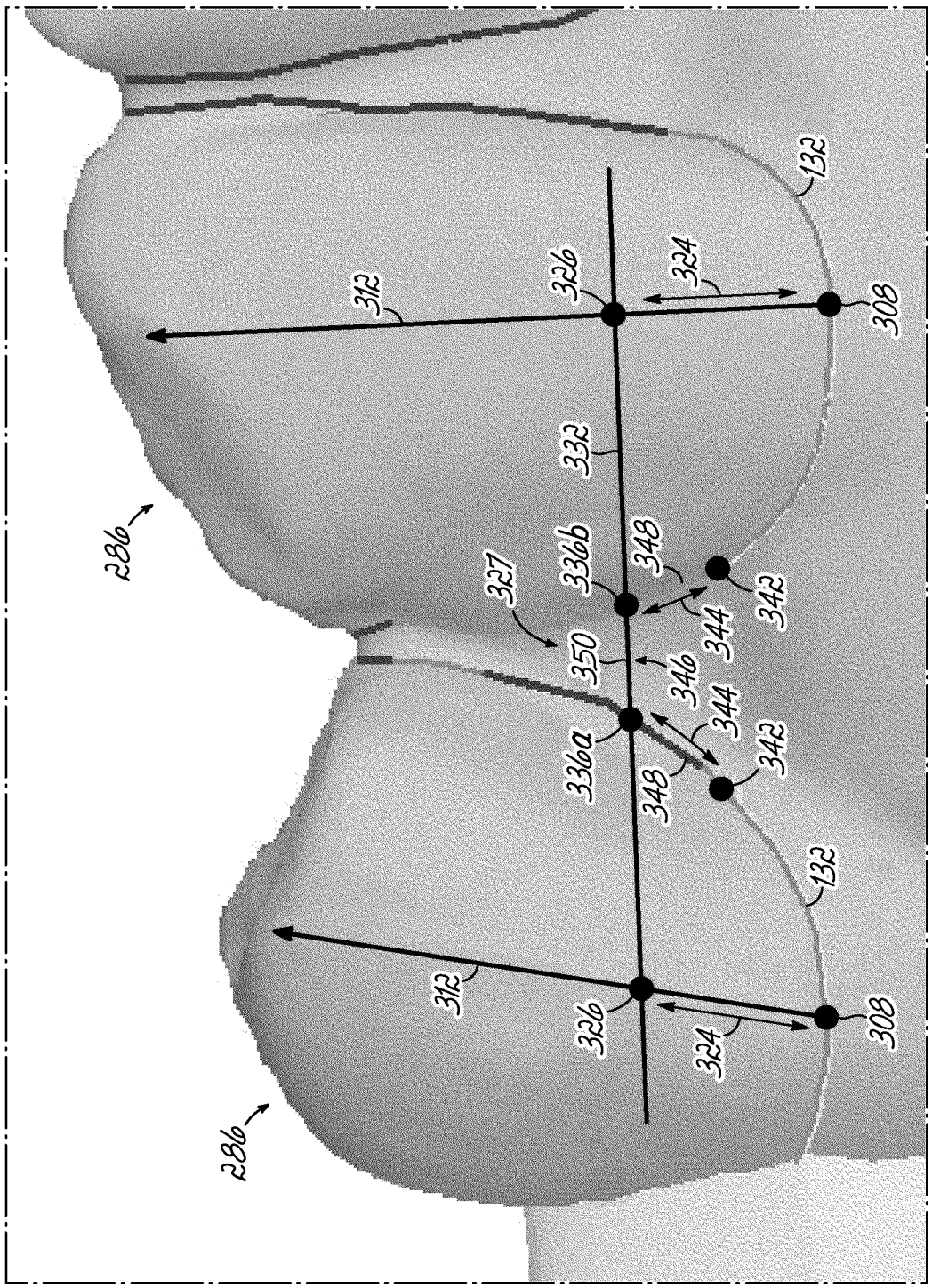
FIG. 24 is a diagrammatic view of the interproximal region of a pair of teeth including additional landmarks that may be used by processes of FIGS. 19 and 20 to generate an initial connector curve.

Referring now to FIG. 24, and with continued reference to FIGS. 19 and 20, in response to defining the junction points 308, 310, the sub-process may proceed to block 284b and define scallop offset points on the enamel surfaces of one or more model teeth 286. By way of example, a labial scallop factor 324 may be used to define a labial scallop offset point 326 on adjacent model teeth 286. The scallop factor 324 may define how far a control point can extend occlusally into the interproximal region 327 between two adjacent model teeth 286.

The labial scallop offset point 326 may be offset occlusally from the labial-enamel-gingival junction point 308 along the labial path 312 by the labial scallop factor 324. Lingual scallop offset points (not shown) may also be defined by applying a lingual scallop factor that offsets the lingual scallop point occlusally from the lingual-enamel-gingival junction point 310 along the lingual path 314. The labial scallop factor may have a different value from the lingual scallop factor, and scallop factors may be set independently for each model tooth 286. By way of example, each scallop factor may be set to a predetermined percentage of the crown height for the model tooth 286 in question. The crown height may be determined, for example, as a vertical distance from a respective enamel-gingival junction point 308, 310 to the most incisal point of the model tooth 286. Setting the scallop factor as a percentage of the crown height may result in each model tooth 286 having a unique scallop factor. As another example, each scallop factor may be set to a constant offset, e.g., 2 mm, 3 mm, etc., in which case the scallop factors may be the same for each model tooth 286. Scallop factors that are a function of both the crown height and a constant offset may also be used.

In response to defining the scallop offset points, the connector curve sub-process may proceed to block 284c and generate one or more scallop planes for each set of adjacent teeth 286. Both a labial scallop plane and a lingual scallop plane may be generated between any two adjacent model teeth based on the respective labial and lingual scallop offset points. For example, a labial scallop plane 332 (depicted edgewise in FIG. 24) may be defined as a plane that includes the labial scallop points 326 of each adjacent model tooth 286. The orientation of this plane 332 about the line connecting the labial scallop points 326 may be defined by one or more additional landmarks. For example, the labial scallop plane 332 may be oriented so that it is perpendicular to one of the vertical axis 296 or the crown-long axis 320 of one of the adjacent teeth 286.

In block 284d, the sub-process may define lingual scallop points (not shown) and labial scallop points 336a, 336b for each of the adjacent teeth 286 as the intersection between the lingual scallop plane (not shown) or labial scallop plane 332 (respectively), and the LAT 132 of each model tooth 286. The LAT 132 may be defined by drawing an edge boundary around a segmented tooth crown surface using unsegmented scan data from a dental scan. In an embodiment of the invention, the LAT 132 may be defined as a line on the crown surface of the model tooth adjacent to a boundary line between the gingiva and enamel or the gingival margin 96. As the teeth move due to morphing, a modified LAT may that is essentially a point of intersection between the tooth crown and gingiva may also be used. In any case, a segmented LAT may be generated by projecting the unsegmented LAT 132 onto the mesh.

The minimum allowable distance between adjacent scallop points 336a, 336b may have a value greater than the radius of the tool which is used to cut the trimline in order to satisfy tooling requirements. For example, the minimum distance between adjacent scallop points 336a, 336b may be twice the tool radius. If this minimum distance is violated, one or both of the scallop points 336a, 336b may be moved along the LAT 132 until the minimum distance parameter is met. By way of example, the distance between scallop points 336a, 336b may be increased by reducing the scallop factor 324, or otherwise moving the scallop plane 332 in an apical direction, i.e., toward the root tips.

In response to defining the scallop points 336a, 336b, the connector curve sub-process may proceed to block 284e and define, for each scallop point 336a, 336b, a transition point 342 on the LAT 132. The position of each transition point 342 may be determined by offsetting the transition point 342 a predetermined distance 344 from the respective scallop point 336a, 336b toward the gingival zenith of the model tooth 286 along the LAT 132. The predetermined distance 344 may be determined, for example, based on a tool radius, e.g., to be greater than the tool radius of the tool used to cut out the aligner. An initial connector curve 346 may then be defined by three segments. For example, the two transition segments 348 comprising a portion of the respective LAT 132 connecting the scallop points 336a, 336b to their respective transition points 342, and an interproximal segment 350 connecting the scallop points 336a, 336b. The interproximal segment may be, for example, a line segment connecting the scallop points 336a, 336b along the shortest possible distance between the scallop points 336a, 336b, or a curved segment that connects the scallop points 336a, 336b along a portion of the virtual surface in the interproximal region 327.

Figure 25:
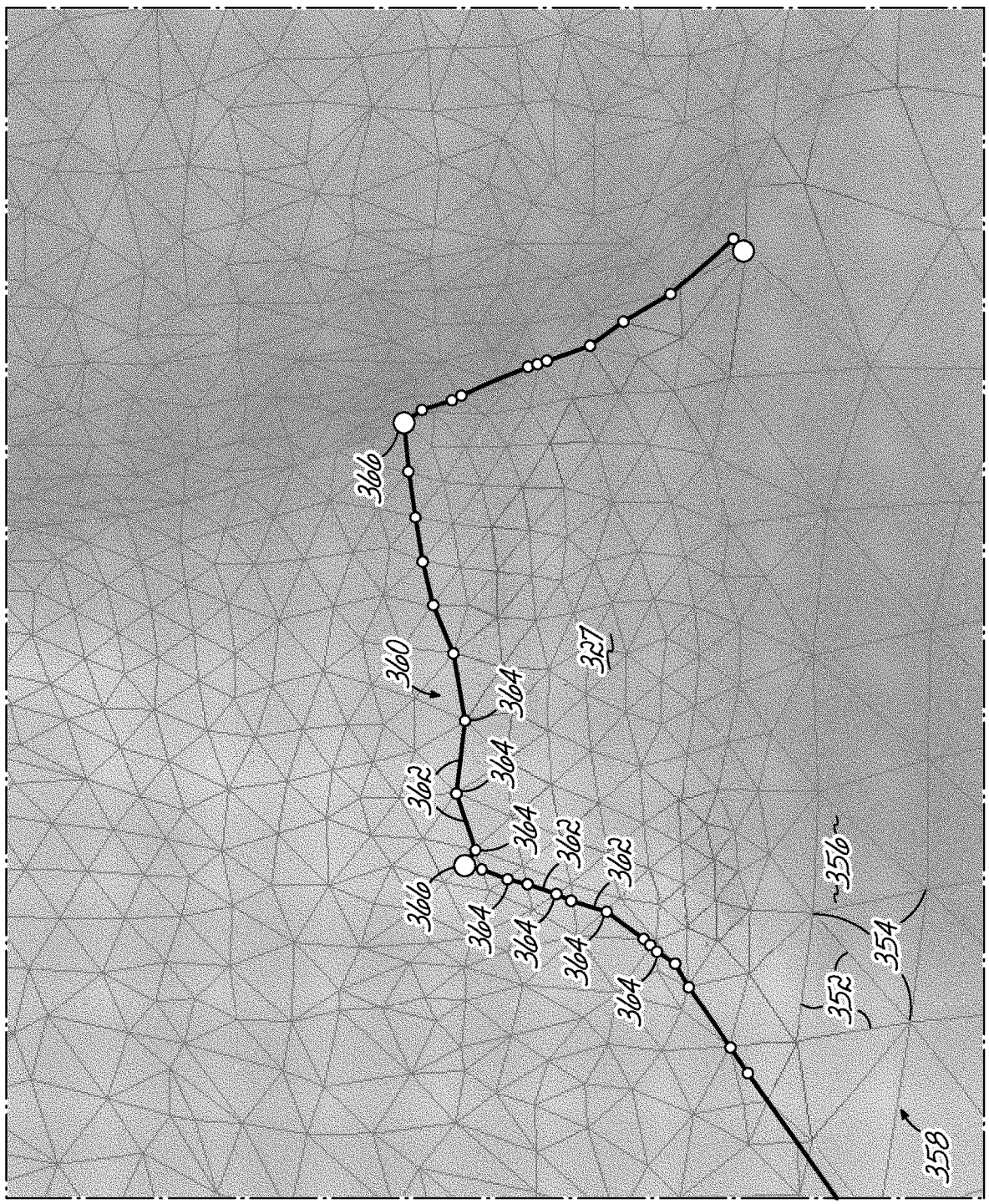
FIG. 25 is a diagrammatic view depicting a polygon mesh and an initial polyline generated by projecting the initial connector curve of FIG. 24 onto the mesh.

FIG. 25 shows the interproximal region 327 of FIG. 24 in more detail, and depicts exemplary edges 352 and mesh vertices 354 defining polygonal faces 356 of the mesh 358 generated from the stitched digital model. Referring again to FIG. 19, in response to the initial connector curve 346 being generated, the process 280 may proceed to block 359 and generate a segmented initial connector curve, or "initial polyline" 360. The initial polyline 360 may be generated by projecting the initial connector curve 346 onto the mesh 358, and defining polyline segments 362 on the mesh 358 that match the projection. Defining a polyline segment 362 may include identifying an edge 352 for use as the polyline segment 362 or locating a polyline vertex 364 on each of two edges 352 of a face 356. In cases where the polyline segment 362 is coextensive with an edge 352, the polyline vertices 364 terminating the polyline segment 362 may occupy the same positions as the mesh vertices 354 terminating the edge 352 in question. In cases where the polyline segment 362 terminates at polyline vertices 364 on the edges 352 of a face 356, the process 280 connects these polyline vertices 364 with a polyline segment 362 that crosses over the face 356. Thus, polyline segments 362 may include some segments 362 that are coextensive with edges 352 of mesh 358, and other segments 362 that connect to edges 352 across faces 356 of mesh 358.

By way of example, one or more polyline segments 362 comprising the initial polyline 360 may include polyline segments 362 corresponding to edges 352 identified as providing a shortest path between projected scallop points 366. These edges 352 may be identified, for example, using Dijkstra's algorithm. The initial polyline 360 may also include polyline segments 362 connecting mesh vertices 354 lying closest to the projected transition segments.

One or more polyline vertices 364 may also be defined at points where the projection of the initial connector curve 346 intersects an edge 352 of mesh 358. These polyline vertices 364 may then be connected to each other by polyline segments 362. As a result, these polyline segments 362 may cross and be coplanar with corresponding faces 356 of mesh 358. In the exemplary embodiment depicted by FIG. 25, some polyline vertices 364 may have been defined by portions of the initial connector curve projection that intersect the edges 352 of mesh 358. These vertices 364 may then have been connected by polyline segments 362 as described above. Other portions of the initial polyline 360 may be defined as mesh edges 352 that satisfy a shortest path algorithm connecting the mesh vertices 354 closest to the projected scallop points 366. The initial polyline 360 may thereby be defined such that each vertex 364 is located on either an edge 352 or a vertex 354 of mesh 358, and each polyline segment 362 is located on an edge 354 or a face 356 of mesh 358.

Figure 26:
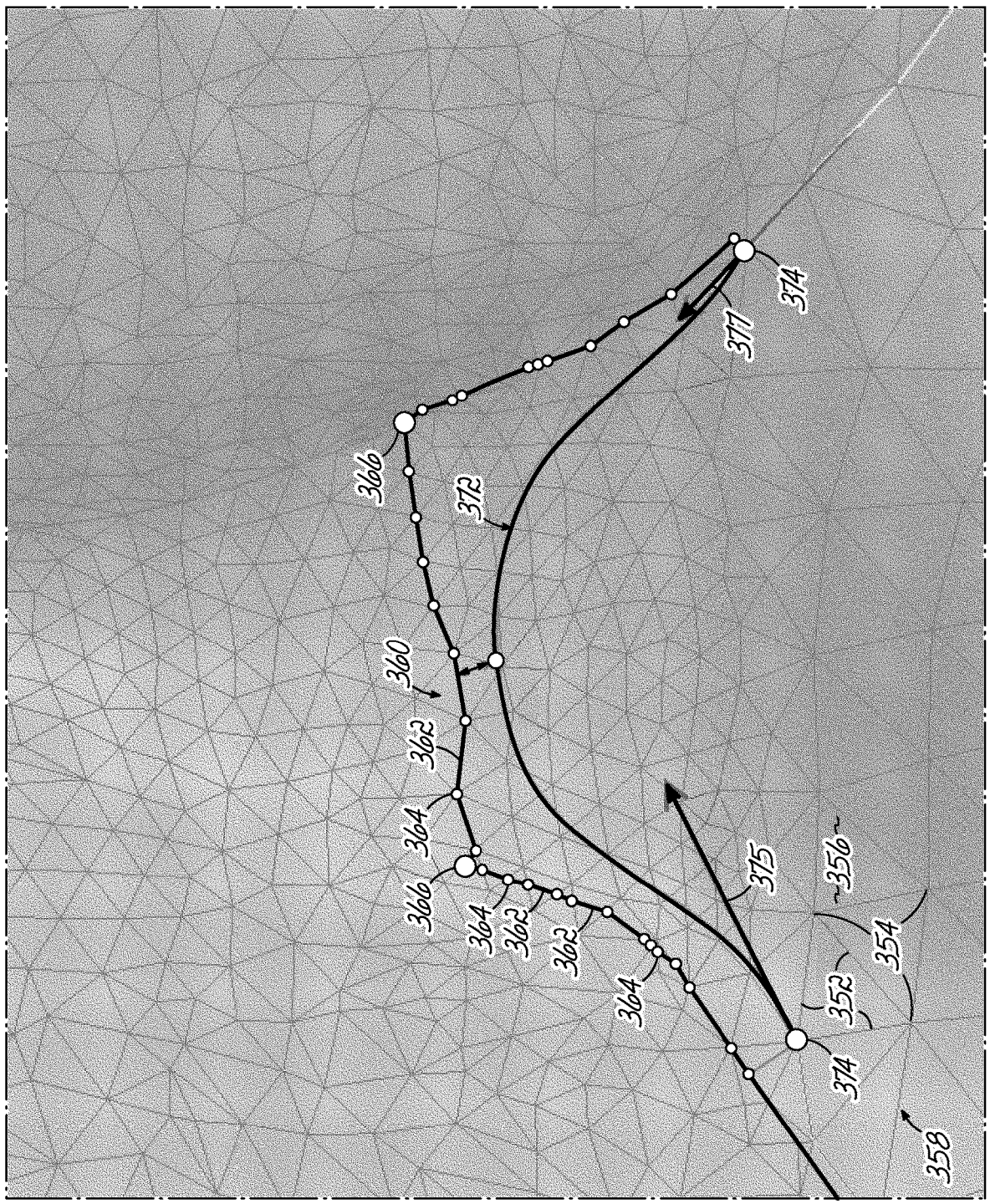
FIG. 26 is a diagrammatic view depicting a smoothed polyline generated from the initial polyline of FIG. 25.

Referring now to FIG. 26, and with continued reference to FIG. 19, the initial polyline 360 may be rough and located close to the initial connector curve 346. Desirable characteristics of the smoothed polyline 372 may include a certain level of smoothness, a shape and location close to that of the initial polyline 360, and end points that can be coupled smoothly with adjacent curves (e.g., tooth curves 98) of the resulting trimline. To these ends, the process 280 may apply one or more of a "limit curvature value" that defines when the smoothed polyline 372 is sufficiently smooth to be integrated into a trimline, a "maximum distance value" that defines how far the smoothed polyline 372 can be located from the initial polyline 360, and tangent vectors 375, 377 that define cones of possible locations for the end points 374 of the smoothed polyline 372.

To reduce the roughness of the initial polyline 360, the process 280 may proceed to block 376 and apply a smoothing function $F_S$ to the polyline. Applying the smoothing function $F_S$ to one iteration of the polyline P(n) may generate a next iteration polyline P(n+1), where P(0) is the initial polyline 360. Thus, each iteration of the smoothing sub-process may be defined by the following equation:

$$P(n+1)=F_S[P(n)] \qquad \text{Eqn. 1}$$

After the smoothing function $F_S[P(n)]$ is applied, the process 280 may proceed to block 378 and validate the polyline P(n+1) by determining if the characteristics of the polyline P(n+1) satisfy one or more predetermined parameters. These predetermined parameters may include those described above with respect to the digital trimline. If the characteristics of the polyline P(n+1) do not satisfy each of the predetermined parameters (e.g., smoothness, shape and location, and end point characteristics) ("NO" branch of decision block 378), the process 280 may proceed to block 380 and take corrective action, e.g., by returning to block 376 and re-applying the smoothing function $F_S$ to the polyline P(n+1). If the characteristics of the smoothed polyline P(n+1) do satisfy each of the parameters ("YES" branch of decision block 378), the process 280 may proceed to block 382, and use the polyline P(n+1) to form a portion of the trimline.

The smoothing function $F_S$ may operate by modifying one or more polyline vertices 364 of the polyline P(n). If each polyline vertex 364 is located on an edge 352 or a mesh vertex 354, each polyline segment 362 will be coplanar with at least one face 356 of mesh 358. The smoothing function $F_S$ may be configured to preserve these characteristics of the polyline segments and vertices. Types of modifications applied to a polyline vertex 364 may include moving the vertex 364, splitting the vertex 364, and eliminating the vertex 364.

Figure 27:
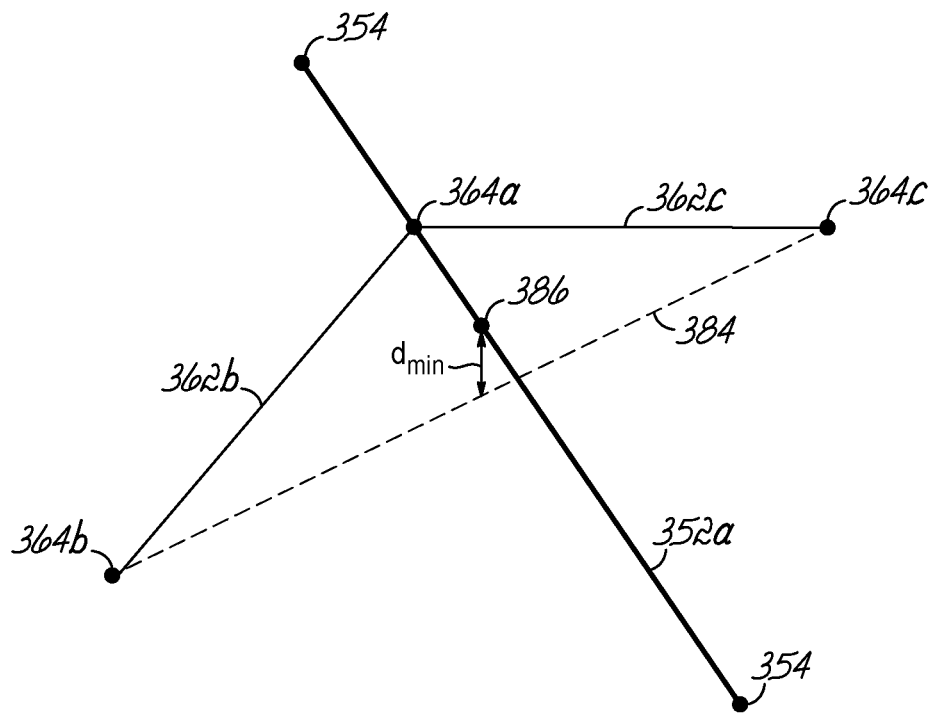
FIGS. 27 and 28 are diagrammatic views that depict moving a polyline vertex from one position to another position on an edge of the mesh.
Figure 28:
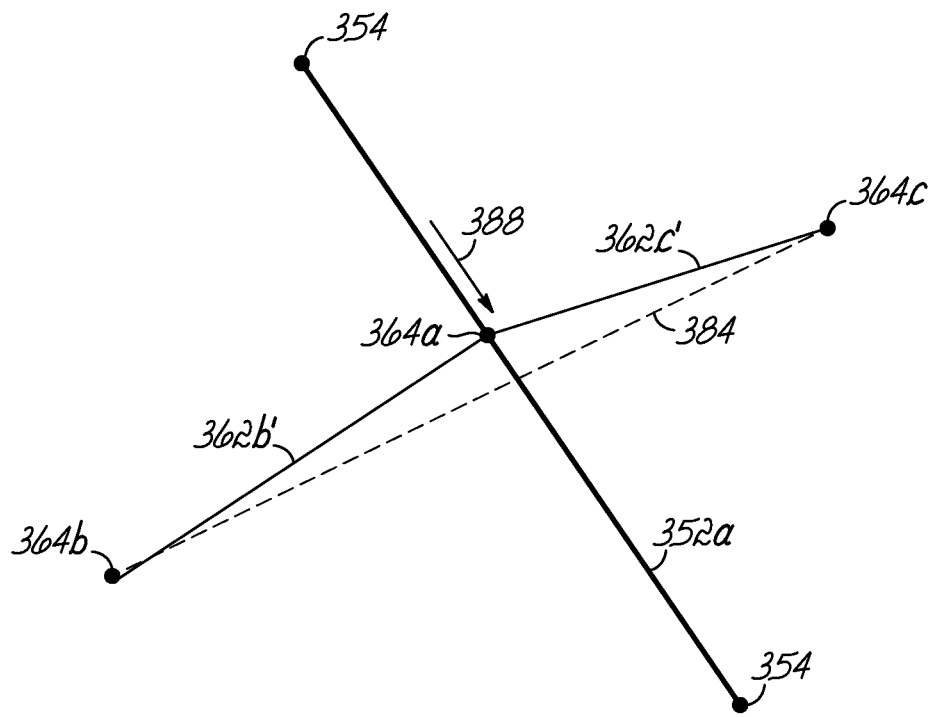

FIGS. 27 and 28 depict an exemplary scenario in which the smoothing function $F_S$ moves a polyline vertex 364a from an initial position on a mesh edge 352a shown in FIG. 27 to a subsequent position on the mesh edge 352a shown in FIG. 28. The polyline vertex 364a may be initially connected to adjacent polyline vertices 364b, 364c by polyline segments 362b, 362c. To move the polyline vertex 364a, the smoothing function $F_S$ may define a connecting line 384 that connects the adjacent polyline vertices 364b, 364c. The smoothing function $F_S$ may then determine a connecting point 386 on the edge 352a that is a minimum distance from the connecting line 384. In cases where the connecting line 384 is coplanar with the edge 352a, the connecting point 386 may be at the intersection of the edge 352a and connecting line 384. In this case, the minimum distance $d_{min}$ would be zero. In the example depicted by FIG. 27, the connecting line 384 is not coplanar with the edge 352a (e.g., the connecting line 384 passes below the edge 352a) such that the minimum distance $d_{min}$ is non-zero. Once the connecting point 386 has been determined, the smoothing function $F_S$ may move the polyline vertex 364a to the location of the connecting point 386 as indicated by arrow 388, and replace polyline segments 362a, 362b with polyline segments 362a', 362b'.

Figure 29:
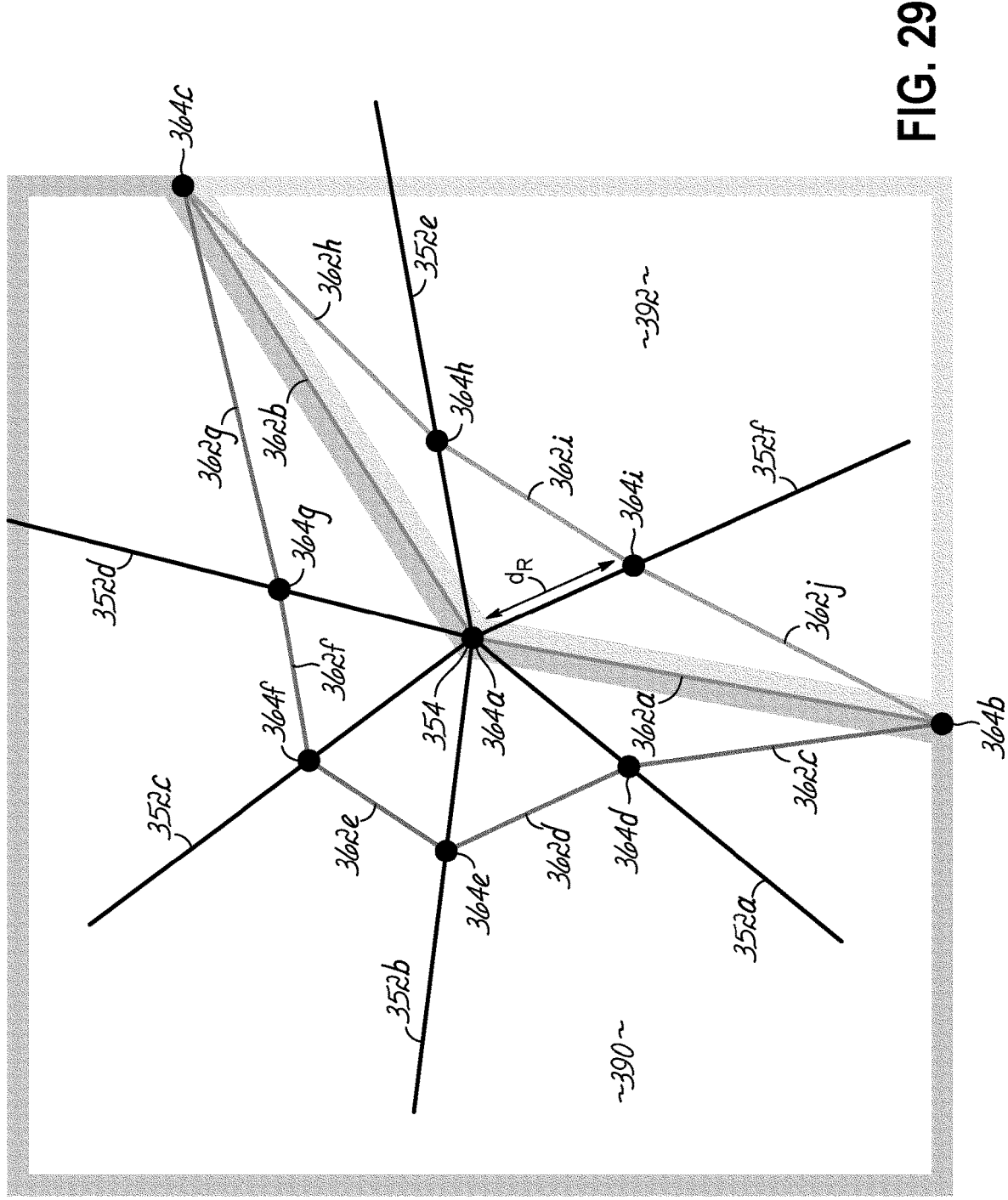
FIG. 29 is a diagrammatic view that depicts splitting of a polyline vertex.

FIG. 29 depicts an exemplary splitting modification to a polyline vertex 364 that may be implemented by the smoothing function $F_S$. Polyline vertices 364 may be split, for example, when the polyline vertex 364 is co-located with a mesh vertex 354, and violates a polyline parameter, such as a minimum allowable angle between polyline segments 362. In the depicted example, a polyline vertex 364a is co-located with a mesh vertex 354 joining a plurality of mesh edges 352a-352f, and is connected to adjacent polyline vertices 364b, 364c by two polyline segments 362a, 362b. To split the polyline vertex 364a, the smoothing function $F_S$ may generate a new polyline vertex 364d-364i on each mesh edge 352a-352f terminated at the polyline vertex 364a. Each child polyline vertex 364d-364i may be offset from the progenitor polyline vertex 364a by a distance $d_R$. The distance $d_R$ may be, for example, a predetermined distance that positions each child polyline vertex 364d-364i at the same Euclidean distance $d_R$ from the progenitor vertex 364a. In this case, each child polyline vertex 364d-364i may be defined by the intersection of a respective mesh edge 352a-352f with a virtual sphere centered on the progenitor polyline vertex 364a and having a radius $d_R$.

The initial polyline segments 362a and 362b may divide the mesh 358 into sectors, e.g., a left sector 390 and a right sector 392. In cases where the polyline segments 362a, 362b form an angle other than 180 degrees, the left (or obtuse) sector 390 may be defined by the maximum angle formed by polyline segments 362a and 362b, and the right (or acute) sector 392 may be defined by the minimum angle formed by polyline segments 362a and 362b. The obtuse and acute sectors 390, 392 may be defined by two planes that intersect at a line which passes through the progenitor polyline vertex 364a and is perpendicular to both polyline segments 362a, 362b, with one of the polyline segments 362a, 362b being coplanar with one plane, and the other of the polyline segments 326a, 362b being coplanar with the other plane. The smoothing function $F_S$ may group mesh edges 352a-352f into one group including the mesh edges 352a-352d located in the obtuse sector 390, and another group including the mesh edges 352e-352f located in the acute sector 392.

The smoothing function $F_S$ may define additional polyline segments 362c-362g connecting the adjacent polyline vertices 364b, 364c through the vertices 364d-364g in the obtuse sector 390, and additional polyline segments 362h-362j connecting the adjacent polyline vertices 364b, 364c through the vertices 364h, 364i in the acute sector 392. The smoothing function $F_S$ may then select the polyline segments 362c-362j requiring the lowest total length to connect the adjacent polyline vertices 364b, 364c. In the depicted example, this would be the polyline segments 362h-362i in the acute sector 392. Once the new polyline segments 362h-362i connecting the vertices 364b, 364c have been selected, the progenitor vertex 362a and original polyline segments 362a, 362b may be deleted.

It should be understood that the descriptions of the smoothing operations contained herein are exemplary only, and that other smoothing functions may be used. For example, filters utilizing cubic interpolation, partial linear filters, etc. may also be implemented by the smoothing function $F_S$. Thus, embodiments of the invention are not limited to any particular smoothing function, and any suitable smoothing function or combination of smoothing functions may be used to smooth the polyline 360.

The smoothing function $F_S$ may be applied iteratively until one or more conditions are met. For example, a smoothness parameter is met, or a maximum number of iterations is reached. Curvature checking may be performed periodically, e.g., after each iteration of the smoothing function $F_S$. Curvature checking may include determining if the smoothed polyline 372 has any polyline vertexes 362 spaced such that a cutting radius smaller than that of the cutting tool or other minimum radius, such as a clinical radii, would be required. If the smoothed polyline 372 includes a radius of curvature below the minimum radius, then the calculations may be stopped. If, during an application of the smoothing function, no polyline vertices 364 are less than a maximum distance from the initial polyline 360, then the calculations may be stopped and the most recent iteration of the polyline P(n) used as the smoothed polyline 372 for generating the trimline.

Each iteration of the smoothing function $F_S$ may tend to reduce the length of the polyline P(n). Thus, as the smoothing process continues, the polyline P(n) may begin to approach a geodesic line between the starting and ending points of the initial polyline 360. To prevent this result, a tangent constraint may be applied to one or more "end vertices" of the polyline P(n). End vertices may be polyline vertices 364 which are within the length of a respective tangent vector 375, 377 from the end of the polyline P(n). For cases where a polyline vertex 364 is on a mesh edge 352 (e.g., such as depicted in FIG. 26), the position to which the polyline vertex 364 is to be moved may be required to be either inside the tangent cone or closer to the tangent vector 375, 377 than the initial polyline vertex 364. In cases where the polyline vertex 364 is co-located with a mesh vertex 354 (such as in FIG. 29), each child vertex 364 in each sector (e.g., 364$d$-364$g$ and 364$h$-364$i$) may be required to either be inside the tangent cone or closer to its tangent vector 375, 377 than the progenitor polyline vertex 364.

Figure 30:
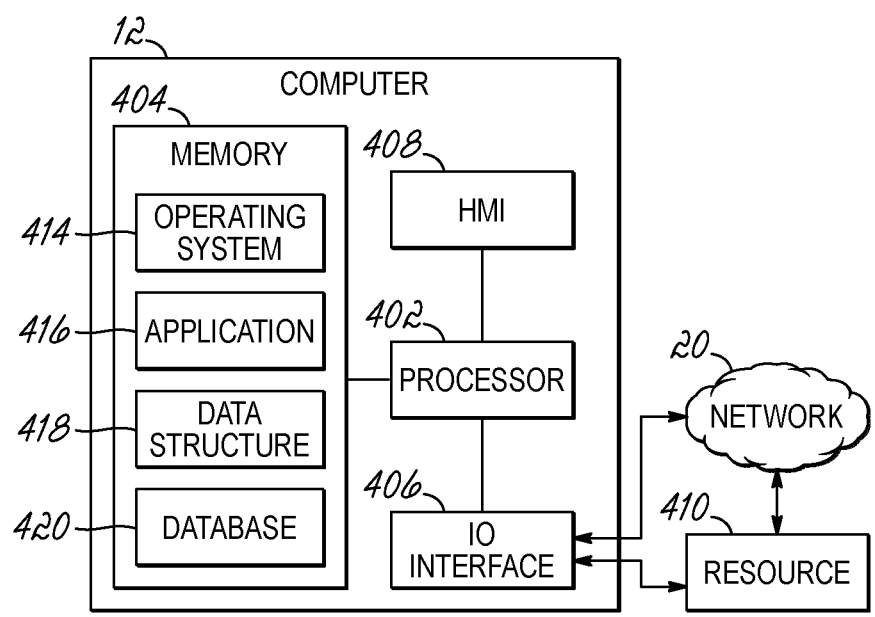
FIG. 30 is a schematic view of a computer that may be used to implement one or more of the systems, devices, models, or processes depicted in FIGS. 1-29.

Referring now to FIG. 30, embodiments of the invention described above, or portions thereof, such as the system 10 may be implemented using one or more computer devices or systems, such as exemplary computer 12. The computer 12 may include a processor 402, a memory 404, an input/output (I/O) interface 406, and a Human Machine Interface (HMI) 408. The computer 12 may also be operatively coupled to one or more external resources 410, such as an intra-oral scanner and CBCT system or machining center, via a network 20 and/or I/O interface 406. External resources may include, but are not limited to, servers, databases, mass storage devices, peripheral devices, cloud-based network services, or any other resource that may be used by the computer 12.

The processor 402 may include one or more devices selected from microprocessors, micro-controllers, digital signal processors, microcomputers, central processing units, field programmable gate arrays, programmable logic devices, solid state machines, logic circuits, analog circuits, digital circuits, or any other devices that manipulate signals (analog or digital) based on operational instructions that are stored in memory 404. Memory 404 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or data storage devices such as a hard drive, optical drive, tape drive, volatile or non-volatile solid state device, or any other device capable of storing data.

The processor 402 may operate under the control of an operating system 414 that resides in memory 404. The operating system 414 may manage computer resources so that computer program code embodied as one or more computer software applications or algorithms, such as an application 416 residing in memory 404, may have instructions executed by the processor 402. In an alternative embodiment, the processor 402 may execute the application 416 directly, in which case the operating system 414 may be omitted. One or more data structures 418, for example the 3-D digital model 70, may also reside in memory 404, and may be used by the processor 402, operating system 414, or application 416 and is manipulated by the clinician.

The I/O interface 406 may provide a machine interface that operatively couples the processor 402 to other devices and systems, such as the external resource 410 or the network 20. The application 416 may thereby work cooperatively with the external resource 410 or network 20 by communicating via the I/O interface 406 to provide the various features, functions, applications, processes, or modules comprising embodiments of the invention. The application 416 may also have program code that is executed by one or more external resources 410, or otherwise rely on functions or signals provided by other system or network components external to the computer 12. Indeed, given the nearly endless hardware and software configurations possible, persons having ordinary skill in the art will understand that embodiments of the invention may include applications that are located externally to the computer 12, distributed among multiple computers or other external resources 410, or provided by computing resources (hardware and software) that are provided as a service over the network 20, such as a cloud computing service.

The HMI 408 may be operatively coupled to the processor 402 of computer 400 in a known manner to allow a practitioner to interact directly with the computer 400 to, for example, operate user interface 120. The HMI 408 may include video or alphanumeric displays, a touch screen, a speaker, and any other suitable audio and visual indicators capable of providing data to the user. The HMI 408 may also include input devices and controls such as an alphanumeric keyboard, a pointing device, keypads, pushbuttons, control knobs, microphones, etc., capable of accepting commands or input from the user and transmitting the entered input to the processor 402.

A database 420 may reside in memory 404 and may be used to collect and organize data used by the various systems and modules described herein. The database 420 may include data and supporting data structures, for example 3-D digital model 70 and/or predetermined parameters 36, that store and organize the data. In particular, the database 420 may be arranged with any database organization or structure including, but not limited to, a relational database, a hierarchical database, a network database, or combinations thereof. A database management system in the form of a computer software application executing as instructions on the processor 402 may be used to access the information or data stored in records of the database 420 in response to a query, where a query may be dynamically determined and executed by the operating system 414, other applications 416, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures (e.g., the 3-D digital model 70), program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an orthodontic appliance including instructions that implement the functions, acts, and/or operations specified in the flow-chart, sequence diagram, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-chart, sequence diagram, and/or block diagram of FIG. 2 may be re-ordered, processed serially, and/or processed concurrently consistent with embodiments of the invention. Moreover, any of the flow-chart, sequence diagram, and/or block diagram of FIG. 2 may include more or fewer blocks than those illustrated consistent with embodiments of the invention.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. A method of defining a trimline for use in the manufacture of an aligner for a patient, the method comprising:
receiving a three-dimensional model of one or more intraoral surfaces of the patient in a virtual space, the one or more intraoral surfaces being associated with a plurality of teeth including a first tooth, a second tooth adjacent to the first tooth, and an interproximal region between the first tooth and the second tooth;
generating a first line around the first tooth and a second line around the second tooth;
defining a scallop plane for the first and second teeth;
defining a first scallop point adjacent to the interproximal region where the scallop plane intersects the first line around the first tooth;
defining a second scallop point adjacent to the interproximal region where the scallop plane intersects the second line around the second tooth;
defining a first transition point a first predetermined distance from the first scallop point along the first line around the first tooth toward a gingival zenith of the first tooth from the first scallop point;
defining a second transition point a second predetermined distance from the second scallop point along the second line around the second tooth toward the gingival zenith of the second tooth from the second scallop point;
defining an initial connector curve including an interproximal segment connecting the first scallop point to the second scallop point, a first transition segment connecting the first transition point to the first scallop point, and a second transition segment connecting the second transition point to the second scallop point;
defining a trimline based at least in part on the initial connector curve;
generating machine code from the trimline for a corresponding orthodontic appliance; and
using the machine code to control a trimming process of a machine to produce the orthodontic appliance having an edge corresponding to the trimline.

2. The method of claim 1, wherein the interproximal segment comprises a line that connects the first scallop point to the second scallop point, the first transition segment comprises a first portion of the first line around the first tooth connecting the first transition point to the first scallop point, and the second transition segment comprises a second portion of the second line around the second tooth connecting the second transition point to the second scallop point.

3. The method of claim 1, wherein the three-dimensional model is represented by a point cloud, and further comprising:
generating, from the point cloud, a mesh that models the one or more intraoral surfaces, the mesh including a plurality of mesh vertices and a plurality of edges, each edge connecting a pair of the plurality of mesh vertices, and each closed set of edges defining a face of the mesh; and
projecting the initial connector curve onto the mesh to generate an initial polyline.

4. The method of claim 3, wherein generating the initial polyline comprises:
generating a polyline vertex at each point in the virtual space where a projection of either the first transition segment or the second transition segment crosses one of the edges; and
connecting each polyline vertex to at least one other polyline vertex with a polyline segment that crosses the face defined by the closed set of edges including the edges on which the polyline segment terminates.

5. The method of claim 4, further comprising:
applying a smoothing function to the initial polyline to generate a smoothed polyline.

6. The method of claim 5, further comprising:
validating the smoothed polyline; and
if the smoothed polyline fails validation, reapplying the smoothing function until the smoothed polyline passes validation, or a maximum number of iterations is reached.

7. The method of claim 3, wherein generating the initial polyline comprises:
identifying one or more edges that connect a first projected scallop point to a second projected scallop point; and
defining one or more polylines coextensive with the one or more edges connecting the first projected scallop point to the second projected scallop point.

8. The method of claim 7, wherein the one or more edges are identified as those providing a shortest path between the first projected scallop point and the second projected scallop point.

9. The method of claim 7, wherein the first projected scallop point is positioned at a point on the edge closest to a position of a projection of the first scallop point onto the mesh, and the second projected scallop point is positioned at the point on the edge closest to the position of the projection of the second scallop point onto the mesh.

10. The method of claim 1, wherein defining the scallop plane comprises:
determining a position of a first enamel-gingival junction point of the first tooth;
determining the position of a second enamel-gingival junction point of the second tooth;
determining a crown-long axis for one of the first tooth or the second tooth;
defining a first scallop offset point on a first enamel surface of the first tooth that is offset occlusally from the first enamel-gingival junction point by a first scallop factor;
defining a second scallop offset point on a second enamel surface of the second tooth that is offset occlusally from the second enamel-gingival junction point by a second scallop factor; and
defining the scallop plane as a plane that includes the first scallop offset point, the second scallop offset point, and a surface normal parallel to the crown-long axis.

11. The method of claim 10, wherein each scallop factor is one of a percentage of a crown height of its respective tooth, a constant offset, or a sum of the percentage of the crown height and the constant offset.

12. The method of claim 10, wherein the first and second enamel-gingival junction points are either labial-enamel-gingival junction points or lingual-enamel-gingival junction points.

13. The method of claim 1, wherein the three-dimensional model is one of a plurality of three-dimensional models each associated with a stage of treatment, and further comprising:
generating an initial three-dimensional model of the teeth and one or more gingiva of the patient from surface imagery, intraoral scan imagery, or both the surface imagery and the intraoral scan imagery;
segmenting the initial three-dimensional model into a plurality of segmented modeled teeth and at least one segmented modeled gingiva; and
defining each of the three-dimensional models by:
incrementally adjusting an orientation of one or more of the segmented modeled teeth to generate a set of adjusted segmented modeled teeth,
generating at least one morphed segmented modeled gingiva by morphing the at least one segmented modeled gingiva to match the set of adjusted segmented modeled teeth,
stitching the at least one morphed segmented modeled gingiva to the set of adjusted segmented modeled teeth, and
filling gaps in one or more interproximal areas between adjacent adjusted modeled teeth to extend a modeled gingiva into previously empty regions between the adjacent adjusted modeled teeth.

14. A system for use in the manufacture of an orthodontic appliance for a patient, comprising:
one or more processors; and
a memory coupled to the one or more processors and including program code that, when executed by the one or more processors, causes the system to:
receive a three-dimensional model of one or more intraoral surfaces of the patient in a virtual space, the one or more intraoral surfaces being associated with a plurality of teeth including a first tooth, a second tooth adjacent to the first tooth, and an interproximal region between the first tooth and the second tooth;
generate a first line around the first tooth and a second line around the second tooth;
define a scallop plane for the first and second teeth;
define a first scallop point adjacent to the interproximal region where the scallop plane intersects the first line around the first tooth;
define a second scallop point adjacent to the interproximal region where the scallop plane intersects the second line around the second tooth;
define a first transition point a first predetermined distance from the first scallop point along the first line around the first tooth toward a gingival zenith of the first tooth from the first scallop point;
define a second transition point a second predetermined distance from the second scallop point along the second line around the second tooth toward the gingival zenith of the second tooth from the second scallop point;
define an initial connector curve including an interproximal segment connecting the first scallop point to the second scallop point, a first transition segment connecting the first transition point to the first scallop point, and a second transition segment connecting the second transition point to the second scallop point;
define a trimline based at least in part on the initial connector curve;
generate machine code from the trimline for a corresponding orthodontic appliance; and
use the machine code to control a trimming process of a machine to produce the orthodontic appliance having an edge corresponding to the trimline.

15. The system of claim 14, wherein the interproximal segment comprises a line that connects the first scallop point to the second scallop point, the first transition segment comprises a first portion of the first line around the first tooth connecting the first transition point to the first scallop point, and the second transition segment comprises a second portion of the second line around the second tooth connecting the second transition point to the second scallop point.

16. The system of claim 14, wherein the three-dimensional model is represented by a point cloud, and the program code further causes the system to generate an initial polyline by:
   generating, from the point cloud, a mesh that models the one or more intraoral surfaces, the mesh including a plurality of mesh vertices and a plurality of edges, each edge connecting a pair of the plurality of mesh vertices, and each closed set of edges defining a face of the mesh;
   projecting the initial connector curve onto the mesh;
   generating a polyline vertex at each point in the virtual space where a projection of either the first transition segment or the second transition segment crosses one of the edges;
   connecting each polyline vertex to at least one other polyline vertex with a polyline segment that crosses the face defined by the closed set of edges including the edges on which the polyline segment terminates;
   identifying one or more edges that connect a first projected scallop point to a second projected scallop point; and
   defining one or more polyline segments coextensive with the one or more edges connecting the first projected scallop point to the second projected scallop point.

17. The system of claim 16, wherein the first projected scallop point is positioned at a point on the edge closest to a position of a projection of the first scallop point onto the mesh, and the second projected scallop point is positioned at the point on the edge closest to the position of the projection of the second scallop point onto the mesh.

18. The system of claim 16, wherein the program code further causes the system to:
   apply a smoothing function to the initial polyline to generate a smoothed polyline;
   validate the smoothed polyline; and
   if the smoothed polyline fails validation, reapply the smoothing function until the smoothed polyline passes validation, or a maximum number of iterations is reached.

19. The system of claim 18, wherein the program code further causes the system to:
   validate the smoothed polyline; and
   if the smoothed polyline fails validation, reapply the smoothing function until the smoothed polyline passes validation, or a maximum number of iterations is reached.

20. The system of claim 14, wherein the program code causes the system to define the scallop plain by:
   determining a position of a first enamel-gingival junction point of the first tooth;
   determining the position of a second enamel-gingival junction point of the second tooth;
   determining a crown-long axis for one of the first tooth or the second tooth;
   defining a first scallop offset point on a first enamel surface of the first tooth that is offset occlusally from the first enamel-gingival junction point by a first scallop factor;
   defining a second scallop offset point on a second enamel surface of the second tooth that is offset occlusally from the second enamel-gingival junction point by a second scallop factor; and
   defining the scallop plane as a plane that includes the first scallop offset point, the second scallop offset point, and a surface normal parallel to the crown-long axis.

21. The system of claim 20, wherein each scallop factor is one of a percentage of a crown height of its respective tooth, a constant offset, or a sum of the percentage of the crown height and the constant offset, and the first and second enamel-gingival junction points are either labial-enamel-gingival junction points or lingual-enamel-gingival junction points.

22. The system of claim 14 wherein the three-dimensional model is one of a plurality of three-dimensional models each associated with a stage of treatment, and the program code further causes the system to:
   generate an initial three-dimensional model of the teeth and one or more gingiva of the patient from surface imagery, intraoral scan imagery, or both the surface imagery and the intraoral scan imagery;
   segment the initial three-dimensional model into a plurality of segmented modeled teeth and at least one segmented modeled gingiva; and
   define each of the three-dimensional models by:
      incrementally adjusting an orientation of one or more of the segmented modeled teeth to generate a set of adjusted segmented modeled teeth,
      generating at least one morphed segmented modeled gingiva by morphing the at least one segmented modeled gingiva to match the set of adjusted segmented modeled teeth,
      stitching the at least one morphed segmented modeled gingiva to the set of adjusted segmented modeled teeth, and
      filling gaps in one or more interproximal areas between adjacent adjusted modeled teeth to extend a modeled gingiva into previously empty regions between the adjacent adjusted modeled teeth.

23. A computer program product for use in the manufacture of an orthodontic appliance for a patient, comprising:
   a non-transitory computer-readable storage medium; and
   program code stored on the non-transitory computer-readable storage medium that, when executed by one or more processors, causes the one or more processors to:
   receive a three-dimensional model of one or more intraoral surfaces of the patient in a virtual space, the one or more intraoral surfaces being associated with a plurality of teeth including a first tooth, a second tooth adjacent to the first tooth, and an interproximal region between the first tooth and the second tooth;
   generate a first line around the first tooth and a second line around the second tooth;
   define a scallop plane for the first and second teeth;

define a first scallop point adjacent to the interproximal region where the scallop plane intersects the first line around the first tooth;
define a second scallop point adjacent to the interproximal region where the scallop plane intersects the second line around the second tooth;
define a first transition point a first predetermined distance from the first scallop point along the first line around the first tooth toward a gingival zenith of the first tooth from the first scallop point;
define a second transition point a second predetermined distance from the second scallop point along the second line around the second tooth toward the gingival zenith of the second tooth from the second scallop point;
define an initial connector curve including an interproximal segment connecting the first scallop point to the second scallop point, a first transition segment connecting the first transition point to the first scallop point, and a second transition segment connecting the second transition point to the second scallop point;
define a trimline based at least in part on the initial connector curve;
generate machine code from the trimline for a corresponding orthodontic appliance; and
use the machine code to control a trimming process of a machine to produce the orthodontic appliance having an edge corresponding to the trimline.

* * * * *

UNITED STATES PATENT AND TRADEMARK OFFICE
CERTIFICATE OF CORRECTION

PATENT NO. : 12,153,398 B2
APPLICATION NO. : 17/201321
DATED : November 26, 2024
INVENTOR(S) : Mithil J. Shah et al.

It is certified that error appears in the above-identified patent and that said Letters Patent is hereby corrected as shown below:

In the Specification

In Column 6, Lines 58-59, change "The program code is further configured cause the one or more" to -- The program code is further configured to cause the one or more --.

In Column 21, Lines 32-34, change "As the teeth move due to morphing, a modified LAT may that is essentially a point of intersection between the tooth crown and gingiva may also be used." to -- As the teeth move due to morphing, a modified LAT that is essentially a point of intersection between the tooth crown and gingiva may also be used. --.

In the Claims

In Column 28, Claim 1, Lines 21-22, change "A method of defining a trimline for use in the manufacture of an aligner for a patient, the method comprising:" to -- A method of manufacturing an orthodontic appliance for a patient, the method comprising: --.

In Column 29, Claim 5, Lines 23-24, change "applying a smoothing function to the initial polyline to generate a smoothed polyline." to -- applying a smoothing function to the initial polyline that forms at least a portion of the trimline. --.

In Column 31, Claim 18, Lines 51-57, change "apply a smoothing function to the initial polyline to generate a smoothed polyline;
    validate the smoothed polyline; and
        if the smoothed polyline fails validation, reapply the smoothing function until the smoothed polyline passes validation, or a maximum number of iterations is reached." to -- apply a smoothing function to the initial polyline to generate a smoothed polyline that forms at least a portion of the trimline. --.

In Column 31, Claim 20, Lines 65-66, change "The system of claim 14, wherein the program code Signed and Sealed this
Fourth Day of March, 2025

Coke Morgan Stewart
*Acting Director of the United States Patent and Trademark Office* causes ... to define the scallop plain by:" to -- The system of claim 14, wherein the program code causes ... to define the scallop plane by: --.